(12) United States Patent
Freyman et al.

(10) Patent No.: US 7,142,660 B2
(45) Date of Patent: Nov. 28, 2006

(54) SYSTEM AND METHOD FOR ADAPTING REMOTE ACCESS TELEPHONY NETWORKS TO NATIONAL DEVIATIONS

(75) Inventors: Phillip Kent Freyman, Elgin, IL (US); Robert C. Stein, Coopersburg, PA (US); Michael Patrick Ryan, Crystal Lake, IL (US); Haneef B. Charania, Skokie, IL (US)

(73) Assignee: General Instrument Corporation, Horsham, PA (US)

( * ) Notice: Subject to any disclaimer, the term of this patent is extended or adjusted under 35 U.S.C. 154(b) by 715 days.

(21) Appl. No.: 10/383,172

(22) Filed: Mar. 6, 2003

(65) Prior Publication Data

US 2004/0028206 A1 Feb. 12, 2004

Related U.S. Application Data

(60) Provisional application No. 60/362,005, filed on Mar. 6, 2002.

(51) Int. Cl.
*H04M 7/00* (2006.01)
*H04L 12/66* (2006.01)
*H04L 12/28* (2006.01)
*H04L 12/56* (2006.01)

(52) U.S. Cl. .............. 379/219; 379/230; 370/352; 370/401

(58) Field of Classification Search ............ 379/219, 379/220.01, 221.08–221.1, 229, 230; 370/352–355, 370/395.5, 400, 401, 466, 467
See application file for complete search history.

(56) References Cited

U.S. PATENT DOCUMENTS

| | | | |
|---|---|---|---|
| 6,370,243 B1 * | 4/2002 | Tiihonen et al. | 379/219 |
| 6,671,282 B1 * | 12/2003 | Haapalehto et al. | 370/401 |
| 6,937,596 B1 * | 8/2005 | Sjolund et al. | 370/352 |
| 2001/0026614 A1 * | 10/2001 | Tiihonen et al. | 379/219 |
| 2002/0057676 A1 | 5/2002 | Cohen-Adiv et al. | 370/352 |
| 2002/0176403 A1 | 11/2002 | Radian | 370/352 |
| 2003/0007495 A1 * | 1/2003 | Thune et al. | 370/401 |
| 2004/0131053 A1 * | 7/2004 | Sjolund et al. | 370/356 |

\* cited by examiner

*Primary Examiner*—Benny Quoc Tieu
(74) *Attorney, Agent, or Firm*—Lawrence T. Cullen

(57) ABSTRACT

A method for configuring an access device that is coupled to an Internet Protocol network enables the access device to apply a desired signal to an access line, which signal is requested by a local exchange. Upon receiving a V5 protocol message from the local exchange requesting the desired signal to be applied to the access line, a voice gateway or Internet Protocol Access Terminal maps the V5 protocol message into a text message in NCS format containing one or more parameters associated with the desired signal and sends the text message to the access device over the Internet Protocol network. Upon receipt of the text message, the access device or media access terminal adjusts its configuration in accordance with the received text message using the one or more parameters included in the text message and one or more default values stored in a management information base accessible to the access device that defines the desired signal. Once configured, the access device applies the desired signal to the access line.

25 Claims, 15 Drawing Sheets

FIG 1 – Exemplary Architecture

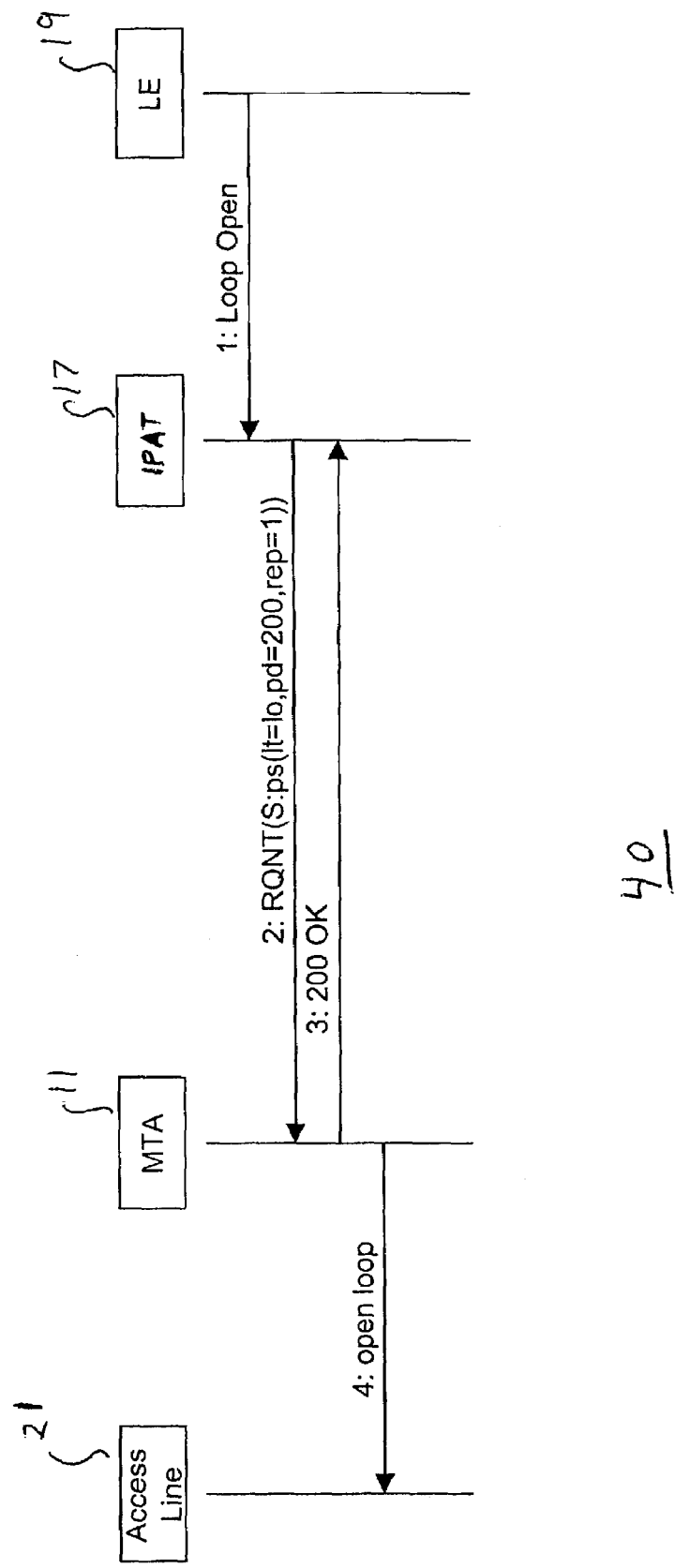
FIG 5 – Pulsed Signal Request

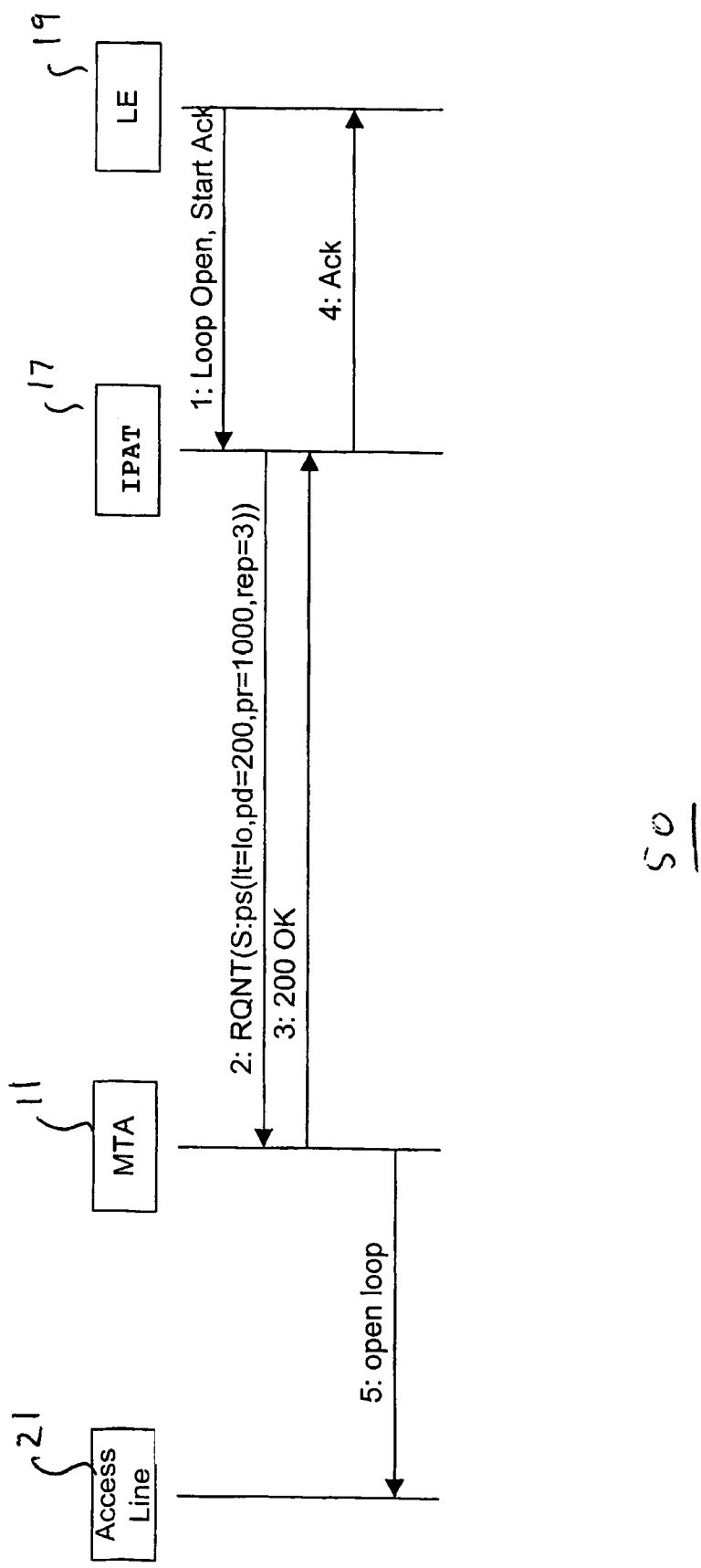
FIG 6 – Pulsed Signal with Start Acknowledgement

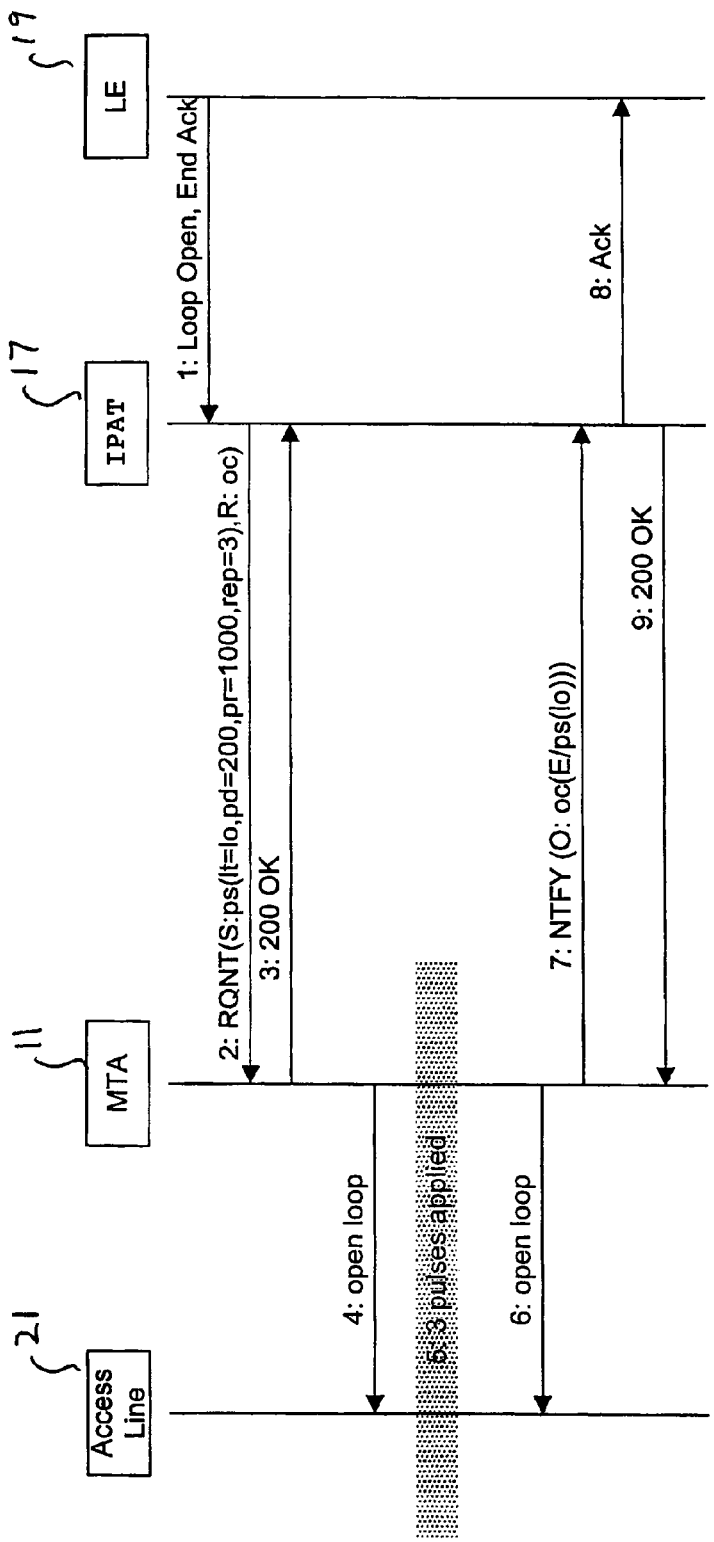
FIG 7 – Pulsed Signal with Completion Acknowledgment

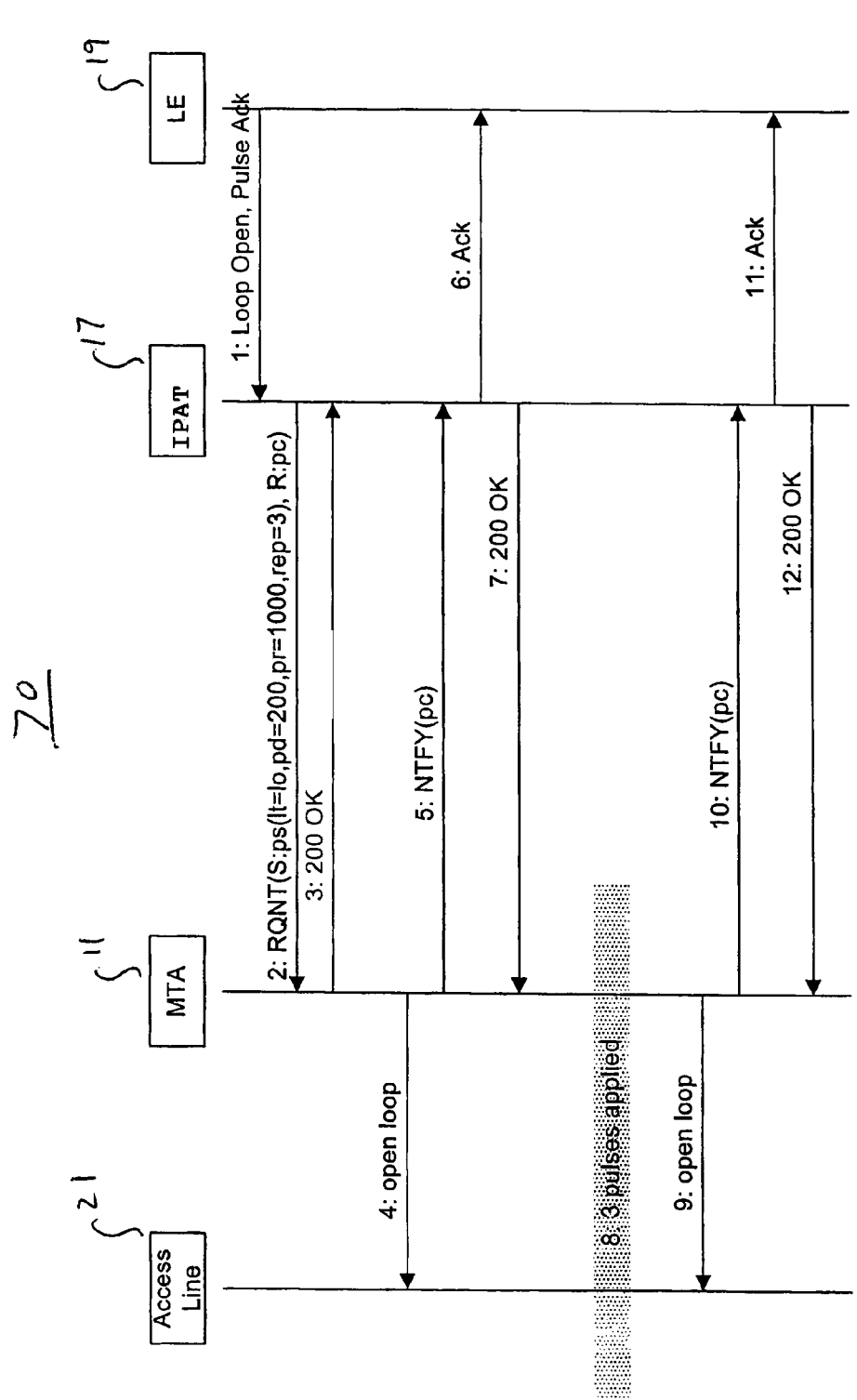
FIG 8 – Pulsed Signal with Pulse acknowledgement

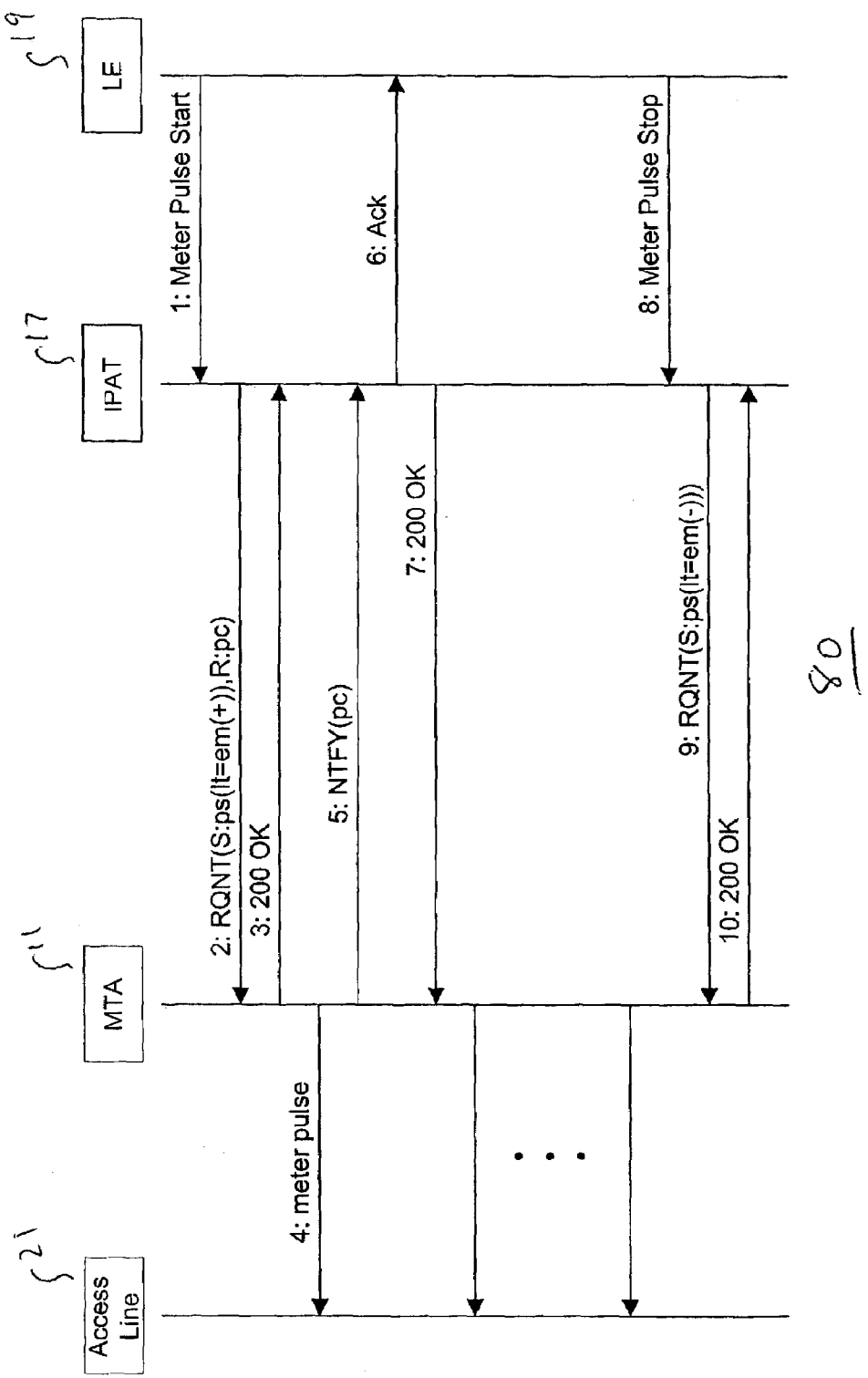
FIG 9 – Metering with Pulse Acknowledgement

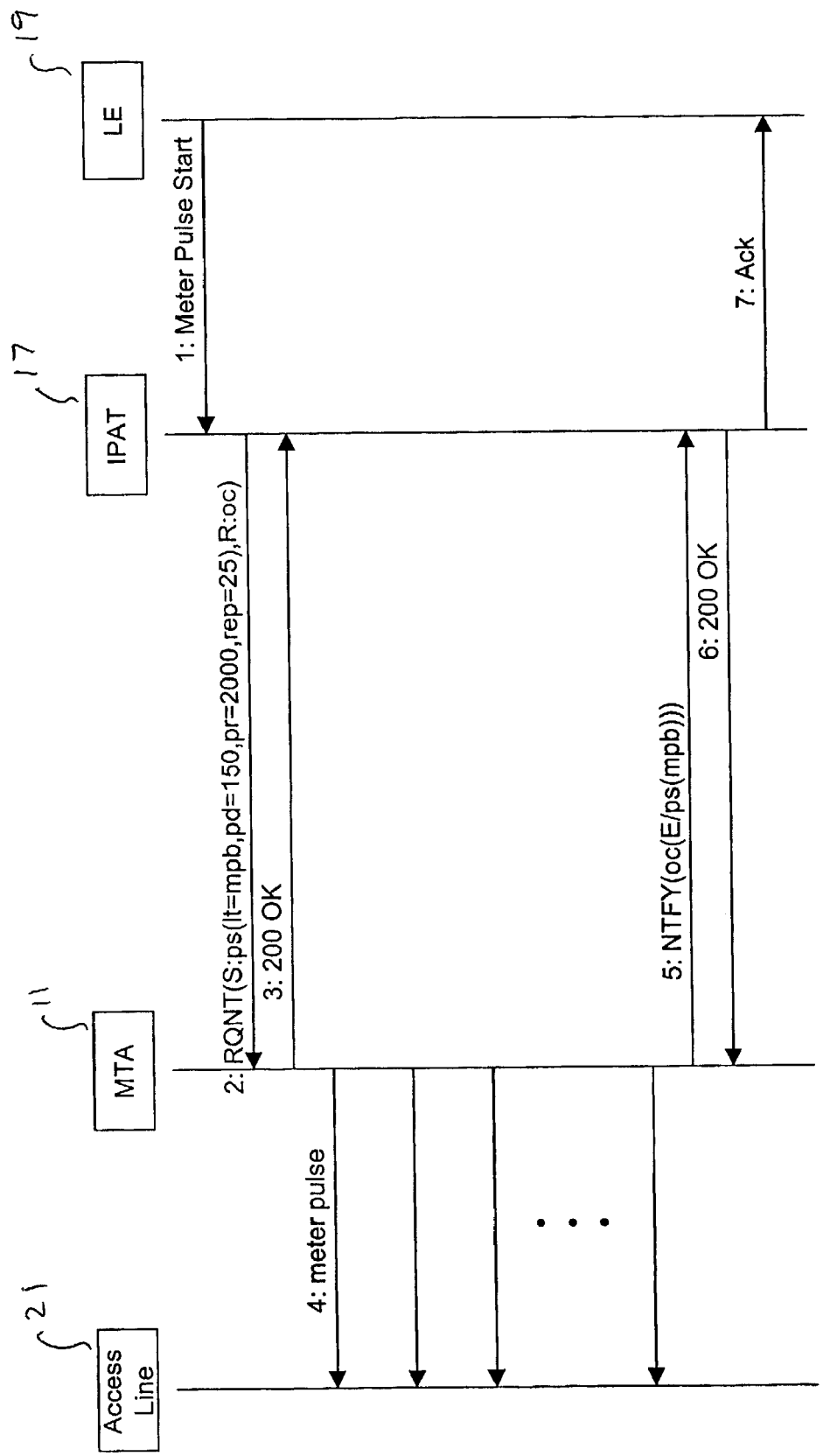
FIG 10 – Fixed Meter Pulse Application, Completed

FIG 11 – Line Treatment Defaults and Range

| lt Code | Description | Frequency (tolerance) | Amplitude (min-max, steps) | pd (min-max, steps) | pr (min-max, steps) | rep (min-max, steps) |
|---|---|---|---|---|---|---|
| ir | Initial Ring | 25 Hz (± 1 Hz) | Full | 200 (0 - 5000, 50) | 200 (0 - 5000, 50) | 1 (1 - 5, 1) |
| lc | Pulsed loop closed | null | null | 200 (0 - 5000, 10) | 1000 (0 - 5000, 10) | 1 (1 - 50, 1) |
| lo | Pulsed loop open | null | null | 200 (0 - 5000, 10) | 1000 (0 - 5000, 10) | 1 (1 - 50, 1) |
| em | (Enable) metering pulse generation | 16 KHz | -13.5 dBm[1] (-25 to +15, 2 dB) | 150 (0 - 5000, 10) | 1000 (0 - 5000, 10) | Null |
| mpb | Metering pulse burst generation | 16 KHz | -13.5 dBm[1] (-25 to +15, 2 dB) | 150 (0 - 5000, 10) | 1000 (0 - 5000, 10) | 1 (1 - 50, 1) |
| nb | Pulsed no battery | Null | 0 | 200 (0 - 5000, 10) | 1000 (0 - 5000, 10) | 1 (1 - 50, 1) |
| np | Pulsed normal polarity | Null | 1 | 200 (0 - 5000, 10) | 1000 (0 - 5000, 10) | 1 (1 - 50, 1) |
| rb | Pulsed reduced battery | Null | 1 | 200 (0 - 5000, 10) | 1000 (0 - 5000, 10) | 1 (1 - 50, 1) |
| rp | Pulsed reversed polarity | Null | 0 | 200 (0 - 5000, 10) | 1000 (0 - 5000, 10) | 1 (1 - 50, 1) |

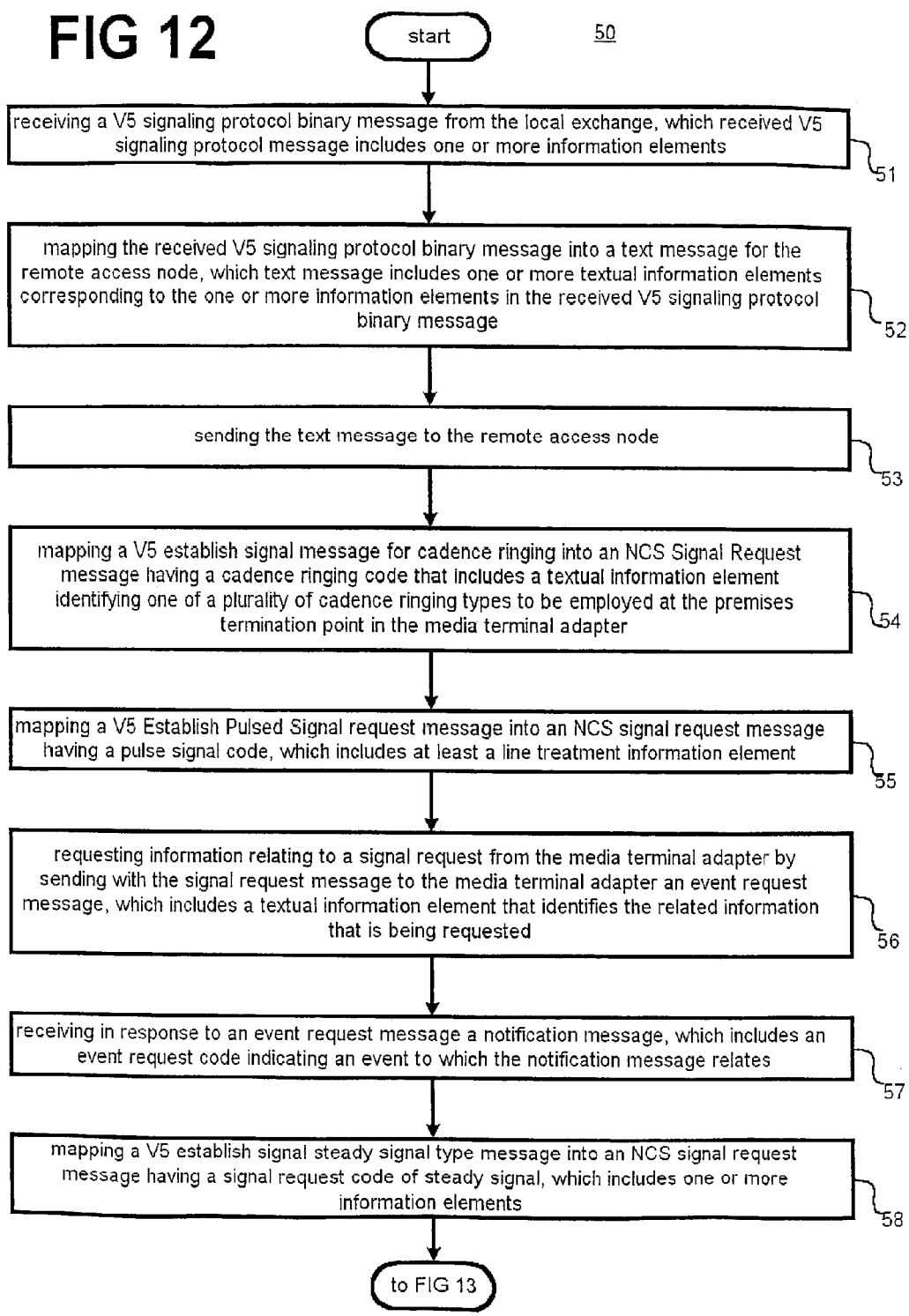

FIG 13

(from FIG 12) 50

61 — if the pulse signal code does not include a pulse duration information element, the media terminal adapter applies a pre-provisioned value for the pulse duration, which pre-provisioned value is stored in a management information base accessible by the media terminal adapter

62 — if the pulse signal code does not include a pulse repeat interval information element, the media terminal adapter applies a pre-provisioned value for the pulse repeat interval that is stored in a management information base accessible by the media terminal adapter

63 — upon receipt of a suppression indicator from the local exchange indicating no suppression, generating an associated line treatment NCS message to the media terminal adaptor instructing the media terminal adaptor to execute the associated line treatment regardless of changes in a line state or additional signal messages from the processor or local exchange

64 — upon receipt of a suppression indicator from the local exchange indicating suppression in response to a predetermined V5 signal message from the local exchange, initiating monitoring for the predetermined V5 signal message, and upon receipt of the predetermined V5 signal message, issuing an associated pulsed signal cancellation message to the media terminal adaptor

65 — upon receipt of a suppression indicator from the local exchange indicating suppression in response to a predetermined line signal from the terminal exchange, initiating monitoring for a predetermined NCS line treatment signal message from the media terminal adaptor, and upon receipt of the predetermined NCS line treatment signal message, issuing an associated pulsed signal cancellation message to the media terminal adaptor

66 — upon receipt of a suppression indicator from the local exchange indicating suppression in response to a predetermined V5 signal message from the local exchange or a predetermined line signal from the terminal exchange, initiating monitoring for the predetermined V5 signal message and a predetermined line treatment signal message from the media terminal adaptor, and upon receipt of either the predetermined V5 signal message from the local exchange or the predetermined line treatment signal message from the media terminal adaptor, issuing an associated pulsed signal cancellation message to the media terminal adaptor End

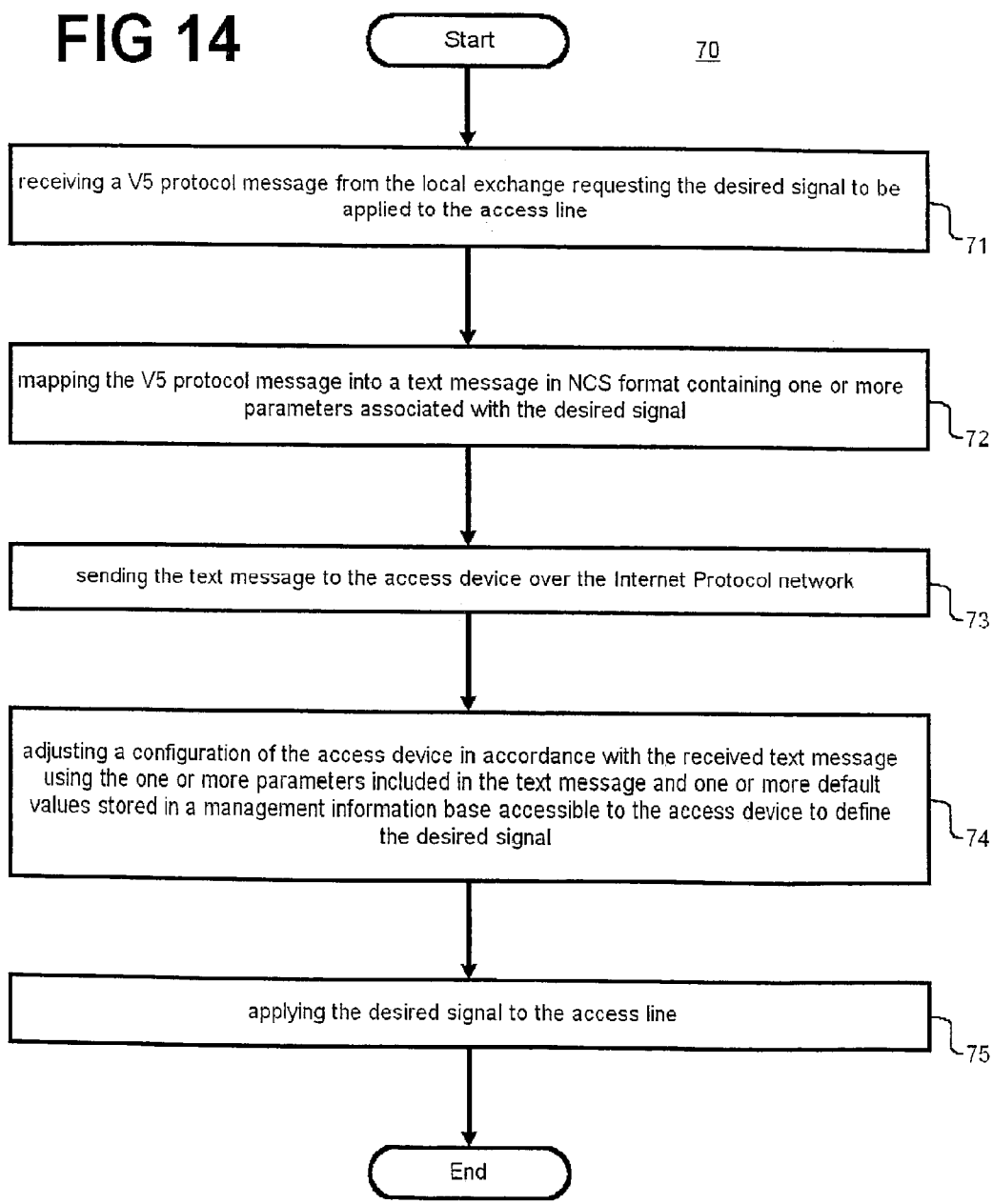

SYSTEM AND METHOD FOR ADAPTING REMOTE ACCESS TELEPHONY NETWORKS TO NATIONAL DEVIATIONS

STATEMENT OF RELATED APPLICATIONS

This application claims priority to U.S. Provisional Application No. 60/362,005 filed on Mar. 6, 2002 by the same inventors and with the same title.

This application is also related to U.S. patent application Ser. No. 10/382,486 entitled "Method For Generalization Of Telephone Signaling Requirements To Support Multiple International Marketplaces In A Single Customer Premises Device" filed concurrently herewith by at least one of the same inventors and assigned to the same assignee. This application is hereby incorporated by reference as if repeated herein in its entirety, including the drawings.

FIELD OF THE INVENTION

The present invention relates generally to methods and apparatuses for conducting telephony signaling, and more particularly to a method and apparatus for conducting telephony signaling in large communication networks, including cable networks and Internet Protocol based networks.

BACKGROUND

In the international telephony marketplace there is historical precedence that varies a number of telephony interface performance parameters across National Boundaries. In the past, products were "nationalized" by either unique hard construction or a combination of hardware and software to adapt to the national deviations. Recent European Union (EU) attempts to "harmonize" these national deviations across the EU have been unsuccessful in achieving complete "harmonization" due to the large base of legacy Telephony Terminal Equipment (TE). Therefore, these national deviations must continue to be accounted for in customer premises equipment.

Yet, manufacturers and telephony operators desire telephony access networks to be capable of adapting to these national deviations without hardware differences in order to reduce terminal equipment compatibility problems, cost and support requirements.

In particular, as it relates to Internet Protocol (IP) based networks, a standards body known as CableLabs was tasked with developing standards for voice-over-IP networks to operate in North America. PacketCable is a communications and signaling standard developed by CableLabs to provide telephony services over a DOCSIS cable modem. DOCSIS stands for Data Over Cable Systems Interface Specifications, which is the CableLabs standard that cable modems use to communicate with the headend and the data network. The ensuing standards developed by Cablelabs/Packetcable provide limited configuration and provisioning capability along with Network Call Signaling (NCS) messages to modify the operation of access devices (called MTAs) based on North American Standards. A Multimedia Terminal Adapter (MTA) is a device that connects to a cable modem and traditional plain old telephone service (POTS) telephone lines to provide telephony service over Hybrid-Fiber-Coax (HFC), and it also interfaces with traditional POTS telephones. These standards essentially describe only one profile of possible operation and are not sufficiently flexible to adapt to all of the variations in the international market.

The present invention is therefore directed to the problem of developing a method and apparatus for enabling Telephony Access Networks to be capable of adapting to national deviations without requiring hardware modifications.

SUMMARY OF THE INVENTION

The present invention solves these and other problems by providing inter alia a method and system for enabling a common hardware device to be built that can be then employed in different countries and used by different system operators in national networks. The common hardware platform is adaptable to various national deviations via a software module that provides a framework under which the hardware platform operates using default values and which framework can accept new values automatically via the system infrastructure to configure the device precisely to the national deviations.

BRIEF DESCRIPTION OF THE DRAWINGS

FIG. 5 depicts a messaging sequence between the local exchange, an Internet Protocol Access Terminal (IPAT), a Multimedia Terminal Adaptor (MTA) and an access line during a pulsed signal request transaction according to another aspect of the present invention.

FIG. 6 depicts a messaging sequence between the local exchange, an IPAT, an MTA and an access line during a pulsed signal with start acknowledgement transaction according to another aspect of the present invention.

FIG. 7 depicts a messaging sequence between the local exchange, an IPAT, an MTA and an access line during a pulsed signal with completion acknowledgment transaction according to another aspect of the present invention.

FIG. 8 depicts a messaging sequence between the local exchange, an IPAT, an MTA and an access line during a pulsed signal with pulse acknowledgement transaction according to another aspect of the present invention.

FIG. 9 depicts a messaging sequence between the local exchange, an IPAT, an MTA and an access line during a metering with pulse acknowledgement transaction according to another aspect of the present invention.

FIG. 10 depicts a messaging sequence between the local exchange, an IPAT, an MTA and an access line during a fixed meter pulse application, completed messaging transaction according to another aspect of the present invention.

FIG. 11 depicts line treatment defaults and ranges used in defining line signaling according to still another aspect of the present invention.

FIG. 12 depicts a flow chart of an exemplary embodiment of a method for coupling a local exchange to a media terminal adaptor via an Internet Protocol Network according to another aspect of the present invention.

FIG. 13 depicts a flow chart of an exemplary embodiment of a method for coupling a local exchange to a media terminal adaptor via an Internet Protocol Network according to another aspect of the present invention.

FIG. 14 depicts a flow chart of another exemplary embodiment of a method for coupling a local exchange to a media terminal adaptor via an Internet Protocol Network according to another aspect of the present invention.

DETAILED DESCRIPTION

Figure 1:
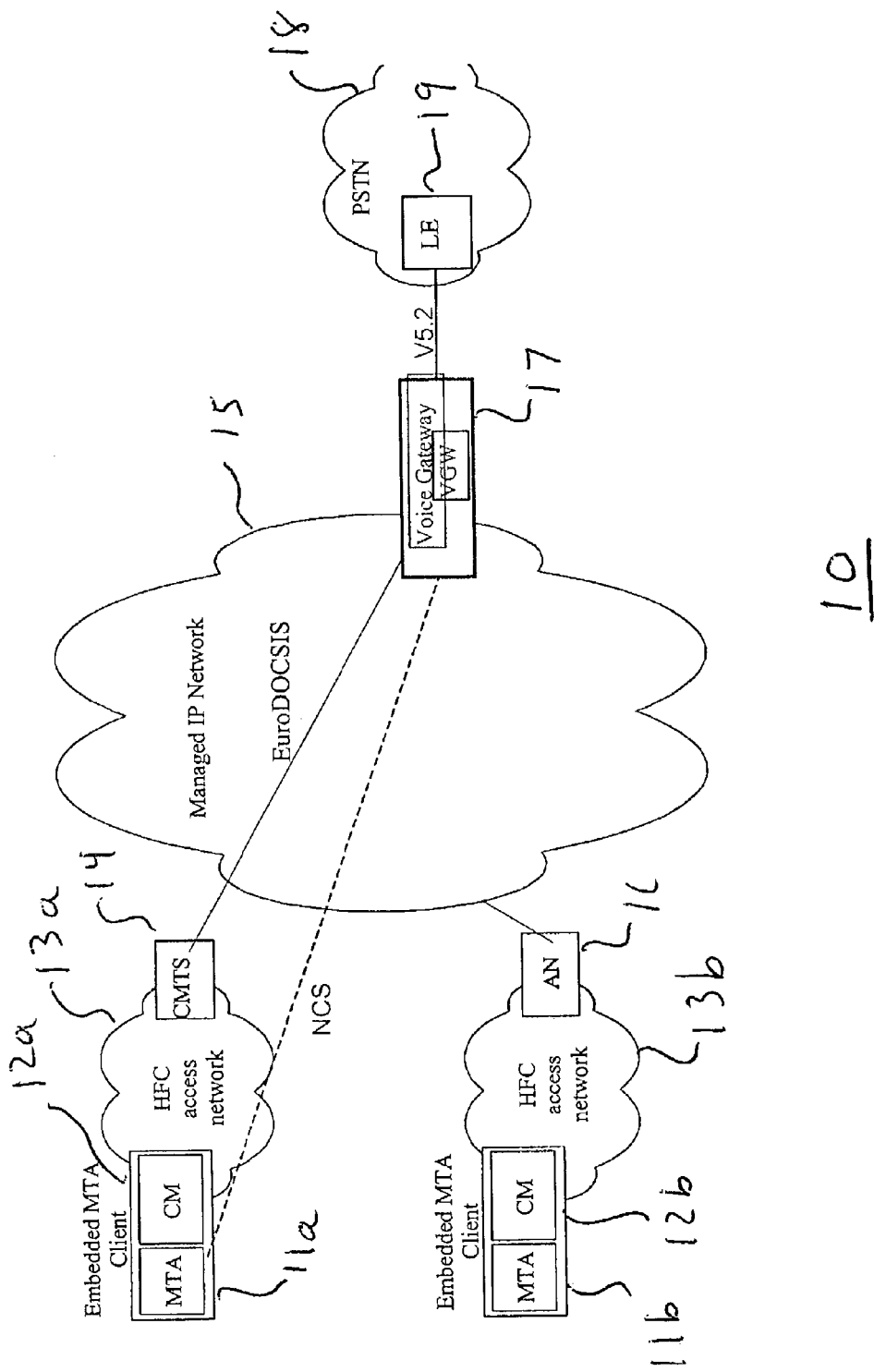
FIG. 1 depicts an exemplary architecture of one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One solution to the above-mentioned problem is to develop flexible hardware platforms and then develop methods to configure these flexible platforms per national deviations. Additionally, it is desirable to be able to re-configure these platforms (e.g., during provisioning) at initial installation and system registration to "customize" their operation to specific customer or installation requirements. Finally, some parameters must be changed dynamically on a per call basis to account for Analog Local Access Signaling Services (ALASS) or Custom Local-Area Signaling Services (CLASS), such as distinctive ringing, Caller Line Identification (CLID), meter pulsing, etc., or to improve network bandwidth utilization by changing bandwidth requirements depending on the content requirements of the channel. The following description provides a method for providing the system and methods to adapt platform performance to equipment vendor, service operator and customer needs.

One aspect of the present invention provides the creation of a method to translate a European V5.x protocol signaling suite to the Access Network Protocol and to provision the Remote Access node to execute signals and parameters under the control of the protocol. Simple Network Management Protocol (SNMP) can be employed to transfer these parameters to the remote access node. Specific aspects of the invention cover, inter alia, expanded cadenced ring variability, pulsed signal requests and steady signal requests unique in the International Marketplace.

Based on a flexible hardware platform for the Access Node, one aspect of the present invention creates a flexible database (MIB) that establishes "default" performance elements that direct the hardware platform to operate to a default set of elements and parameters (configuration). This initial MIB definition is called the default mode of operation. It is conceived that this "default" set of elements and parameters would align with the most common set of performance requirements (e.g., EU "harmonized" standards). Essentially, this MIB definition provides a framework that covers all possible national deviations by establishing parameters and ranges for all of the possible variables, and then accepts values that specify completely, as necessary, the specific national deviations.

According to another aspect of the present invention, a "provisioning" process is defined where upon registration on the Telephony Network, the flexible Hardware Platform "Default" MIB is revised (e.g., provisioned) per national or customer requirements. These revisions would result in a change in the performance characteristics of the flexible hardware platform.

According to yet another aspect of the present invention, a set of software instructions is defined that are communicable across the network to direct the flexible hardware platform to execute the MIB defined performance parameters.

According to still another aspect of the present invention, a set of extended software instructions are defined that provide informational elements during a call set up or during an operational call to temporarily change the MIB elements and direct the flexible hardware platform to alter its performance characteristics for that call or call condition.

Telephony Parameters

The following Telephony Parameters may be adapted by the methods described in this application, but the inventions herein are not limited to or bound by these parameters. By using the techniques specified herein, at least each of the following parameters can be completely tailored to any existing national deviations. Moreover, new national deviations not currently specified may be created using the techniques herein given the broad range and flexibility now possible for the following parameters of line signaling:

Telco Line Impedance
Receive audio loss (downstream loss, Digital-to-Analog (D/A) loss, per ITU-T Q.551.Q.552—Lo)
Transmit Audio Loss (upstream loss, Analog-to-Digital (A/D) loss, per ITU-T Q.551/Q.552—Li)
DC Loop Current
DC Loop Voltage (Vbatt)
Loop Polarity/Polarity Reversal
Loop Break Timing—Hook switch, flash hook (Hook flash), dial pulse (pulse dialing)
VoCoder coding law
Supervisory Tone generation
Dual Tone Multi Frequency (DTMF) decoding
DTMF tone encoding
Numbering Plans
On Hook Data Transmission protocol
On Hook Data Transmission tones
Off Hook Data Transmission protocol
Off Hook Data Transmission tones
Ring Signaling (cadence table)
Metering—50 Hz, 12 kHz, 16 kHz
"K-break"—timed loop break (disconnect)

While the above list may not be all-inclusive, it is also not required to support all of these features depending on choices made in product design. The methods being described herein provide a method to enable these parameters to be modified if the Access Device is capable of changing its operation.

ETSI ETS 300 001 defines many of these parameters and their national deviations.

Flexible Hardware Platform

An example of a flexible hardware platform includes an Access Device, such as a Cable Modem with an Embedded Media Terminal Adapter, or a Cable Modem with a Media Terminal Adapter. Examples of flexible hardware platforms include the Motorola CG4500/4500E and CG5500/5500E products. The CG4500/5500 Series Communications Gateways are available in two models, which support the DOCSIS and EuroDOCSIS protocols. The CG4500/5500 Communications Gateways support two Plain Old Telephone Service (POTS) lines via two independent, RJ-11 interface jacks. Either telco line may be enabled or disabled remotely and independent of the other line. In addition to supporting telephony services, the Communications Gateways also provide high-speed data links with 10/100 Base T Ethernet and USB data ports.

Design technology has progressed to the point where all of the above line signaling parameters may be defined in hardware or in a combination of hardware and software. As the hardware is capable of altering its performance for any one of these parameters or others under software control, the following descriptions apply in the configuring, provisioning and call processing of Analog Telephony.

Parameter Definitions

For each Telephony Performance Parameter, there are several attributes that describe the actual performance characteristic of the Parameter being described. In general, one would consider the format of the database and messages that support the adaptive Telco functionality as:

Parameter: attribute1, attribute2, attribute3, . . . , attributeN

Thus, the database has entries for each of the above parameters and related attributes associated with each of these entries.

Management Information Base (MIB)

The MIB is a collection of managed objects residing in a virtual store, such as a Data Base (DB), which is used to configure or provision the Access Device to perform with the defined parameters as noted above. Usually, this database is centralized and under the control of the system operator. The DB may be structured to allow parameter definition on a system wide, individual device or on a per line basis. The MIB, its management system (e.g., parameter/attribute setting) and method of distributing the contents of the MIB are well known to those familiar in the state of the art, and hence need not be repeated herein.

In general, attributes can be defined based on the nature of the parameter to be adapted.

Parameters that are to be generated by the Access Device will have the following attributes: e.g., amplitude, frequency, duration and cadence timing (e.g., on/off pattern, inter-digit timing, etc.). Other attributes can be specified as well, as necessary.

Parameters that are to be received or detected by the Access Device will have the following attributes: e.g., level, frequency, minimum duration, maximum duration, cadence timing (e.g., on/off pattern, inter-digit timing min/max, etc.). Similarly, other attributes can be specified as well.

Some parameters are value specific, such as for example:

Line Impedance is generally described as a series resistance feeding a parallel combination of a second resistance and a parallel capacitance.

Loop current or Loop Voltage will be specific value parameters.

Loop polarity—Forward loop, Reverse loop

VoCoding Law—G.11 µ-law, G.711 A-law, G.723, G.728, G.729, G.729e, etc.

Dialing Plan—specific digits and digit sequences.

Tolerances are not defined in the system since these are defined by the Access Device hardware and software design characteristics.

Provisioning

The process of configuring and Provisioning Access Devices is well known to those knowledgeable in the state of the art, and hence need not be repeated herein. Expanded parameters and attributes communicated during the provisioning process are described herein.

Network Call Signaling (NCS)

The embodiments described herein utilize NCS messages. Since NCS is a profile of Media Gateway Control Protocol (MGCP) (i.e., the Voice-Over-IP standard adopted by PacketCable) anyone knowledgeable in the art could apply the same messages, principles, and practices with that protocol or any one of a number of other protocols such as Distributed Call Signaling (DCS) or H.323 (an ITU Teleconferencing protocol). As such, the inventions herein are not limited to any one of these protocols.

The CableLabs/PacketCable NCS definition in document Pkt-SP-EC-MGCP-I 01-990312 only defines a limited capability to control some parameters as defined by Telcordia Telephony documents, such as TA-NWT-000909 and TR-NWT-000057. To enhance Access Networks to adapt to the wide range of national deviations and some unique parameters in the international market, the original NCS work is expanded as described herein. Thus, a new line package is defined for NCS (e.g., a European line package) to handle the national deviations without conflicting with the original PacketCable NCS Line Package specification.

These messages direct the access device to set parameter values or conditions. In some messages, the values are implied (not stated) so that the provisional values are used. In other cases, the messages are expanded to supply alternate attributes to be used and to supersede the provisional values. Thus, to modify an access device to configure a given line signaling parameter, a message is sent to the access device (e.g., from a system operator node, or under control of a system operator), which message completely adjusts the given line signaling parameter in accordance with the attributes specified in the message. The end result is that the access device now operates according to the specified functionality.

Overview

This section describes an application of the NCS protocol to an IPAT device that is capable of emulating an Access Network to an European compliant Local Exchange (LE) that forms a part of a Switched Circuit Network (SCN). Described herein is the mapping between the NCS protocol and a subset of the V5.2 protocol [ref ETS 300 324] applicable for the support of SCN services to analog telephones.

Various aspects of the present invention enable cable operators to provide telephony services over their Hybrid-Fiber-Coaxial (HFC) cable plants while using existing V5 Switch capacity for SCN access.

This section applies to a subset of the V5 signaling protocol that relates to services provided by a two-wire (a-b terminals), loop start, analog Plain Old Telephone System (POTS) line.

The protocol described herein enables the support of the suite of V5 SCN POTS services. In cases where a product may not support a specific service, protocol compliance should be interpreted as being able to accept the protocol interface and mitigate mismatches in service requests to product capabilities, thereby enabling product complexity and cost to be optimized per market requirements and administration needs while maintaining protocol inter-operability. In the descriptions herein, G.711 only is assumed.

Voice Gateway Architecture

An exemplary system architecture to couple a Media Access Terminal 11 to a local exchange 19 via a Voice Gateway 17 and IP Network is shown in FIG. 1. The Internet Protocol Access Terminal (IPAT) 17 provides inter-working between an IPCableCom compliant network 15 and a Local Exchange 19 that is a part of a Switched Circuit Network (SCN) 18. The interface between the IPAT and the Local Exchange uses a subset of ETS 300 324 that is applicable to support of SCN services to an analog telephone.

Figure 15:
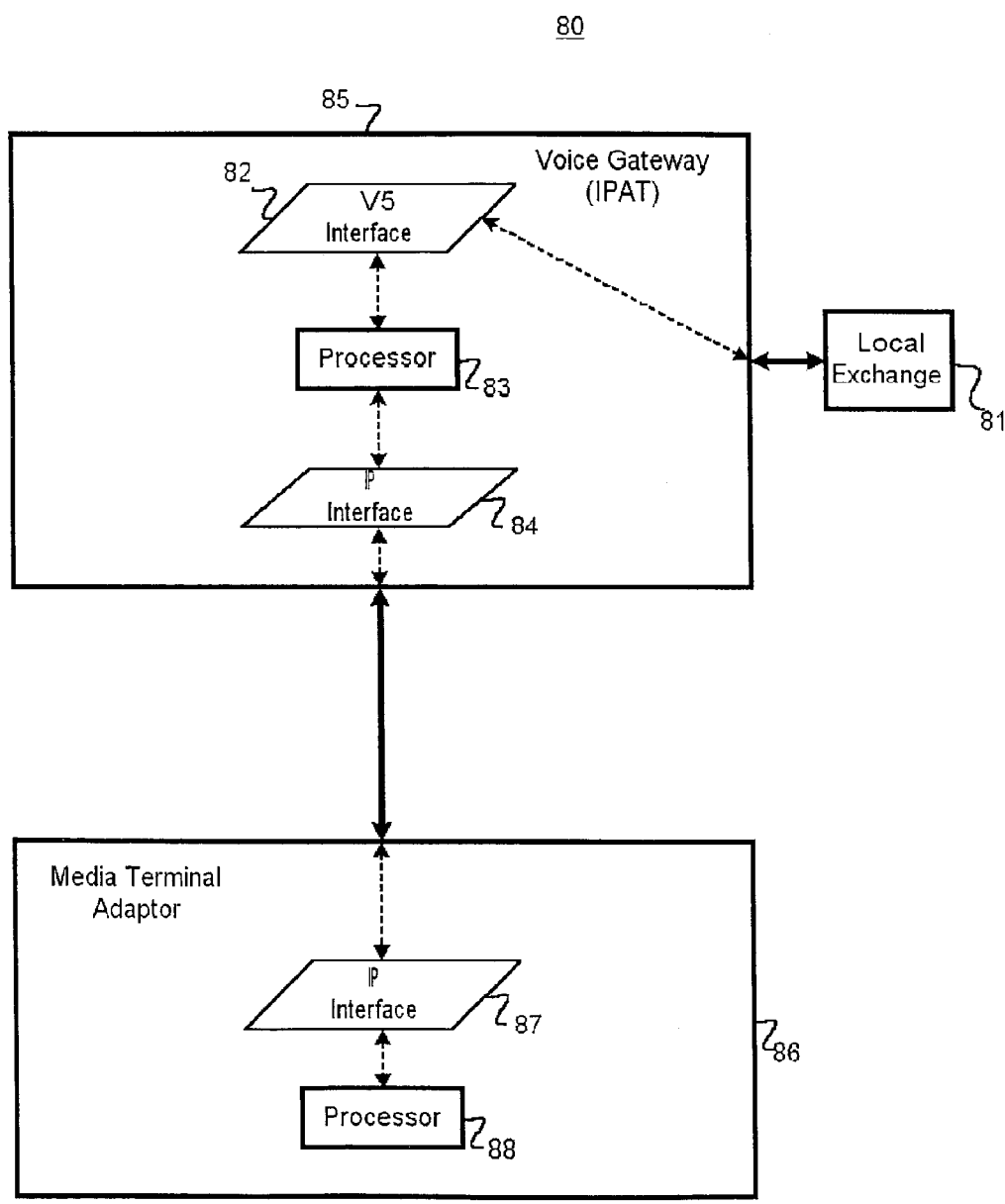
FIG. 15 depicts a block diagram of an exemplary embodiment of an apparatus for coupling a local exchange to a media terminal adaptor via an Internet Protocol Network according to yet another aspect of the present invention.

FIG. 15 shows an exemplary embodiment of the Voice Gateway 85 and the Media Terminal Adaptor 86. The Voice Gateway employs an IP Interface 84 via which to communicate to the Media Terminal Adapter, which also employs a similar IP Interface 87. In addition, the Voice Gateway 85 uses a V5 interface 82 to communicate with the Local Exchange 81. A processor 83 performs the mapping and translation of the signals to/from the Local Exchange to messages from/to the Media Terminal Adapter. The Media Terminal Adapter 86 accesses a memory storing Management Information Base 89 for default parameters as needed to completely define a given telephony operation when these parameters are not provided in the text messages received by the Media Terminal Adapter.

The mapping specified herein makes no assumptions about the internal structure of the IPAT, however, it is assumed to provide both signaling and media inter-working functions.

Electrical and Physical Interface Requirements

The methods and system architecture set forth herein assume an ETS 300 324 defined system architecture consisting of a Local Exchange (LE) 19 and an Access Network 16 (AN) connected via a V5 interface. The V5 interface may have between one and sixteen 2048 kbit/s interfaces, as defined in ETS 300 347-1, ETS 300 166 and ETS 300 167. The electrical and physical characteristics of the interface conform to ETS 300 166, 2048 kbit/s case.

Two interface presentation alternatives are defined in ETS 300 166, the balanced interface pair type and the coaxial type. According to the two alternatives of interface applications shown in FIG. 1, it is left to the network operator to request the interface presentation required.

Figure 2:
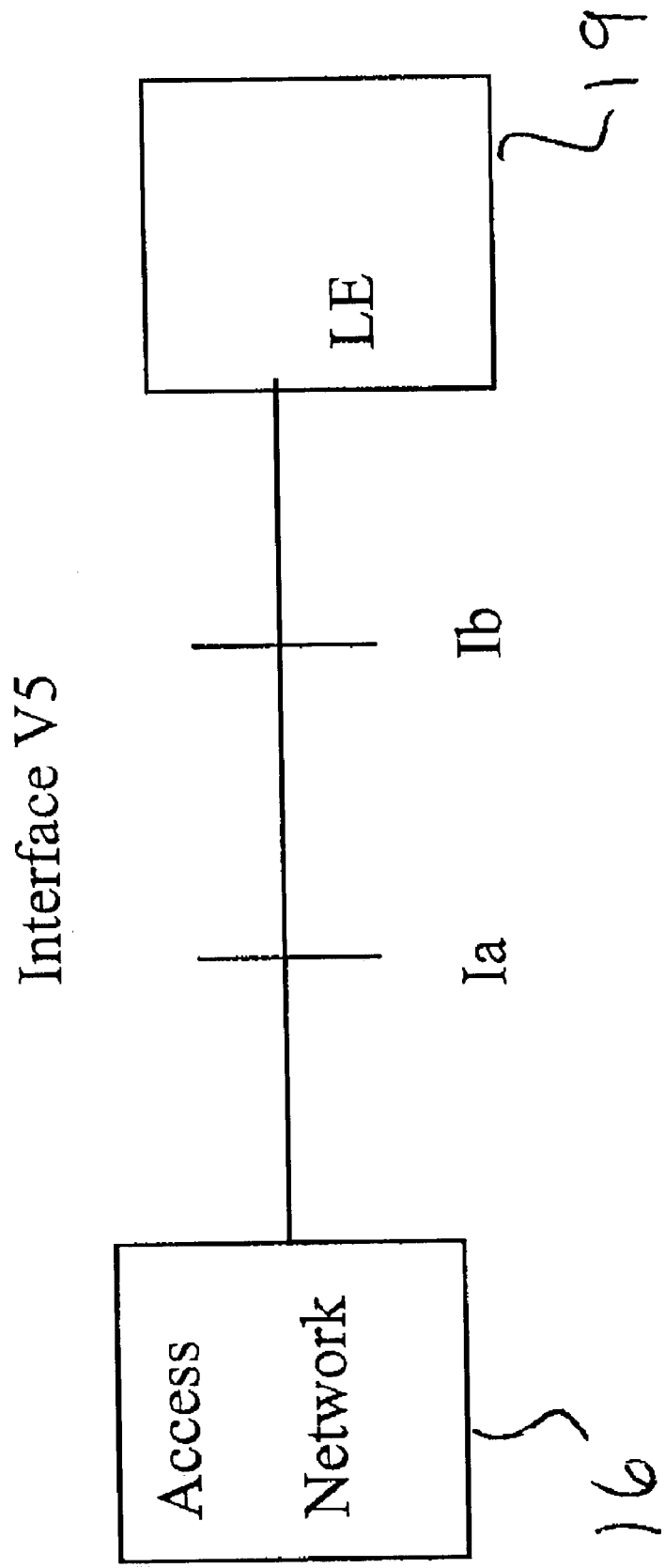
FIG. 2 depicts one way of coupling an access network to a local exchange to which various aspects of the present invention are applicable.
Figure 3:
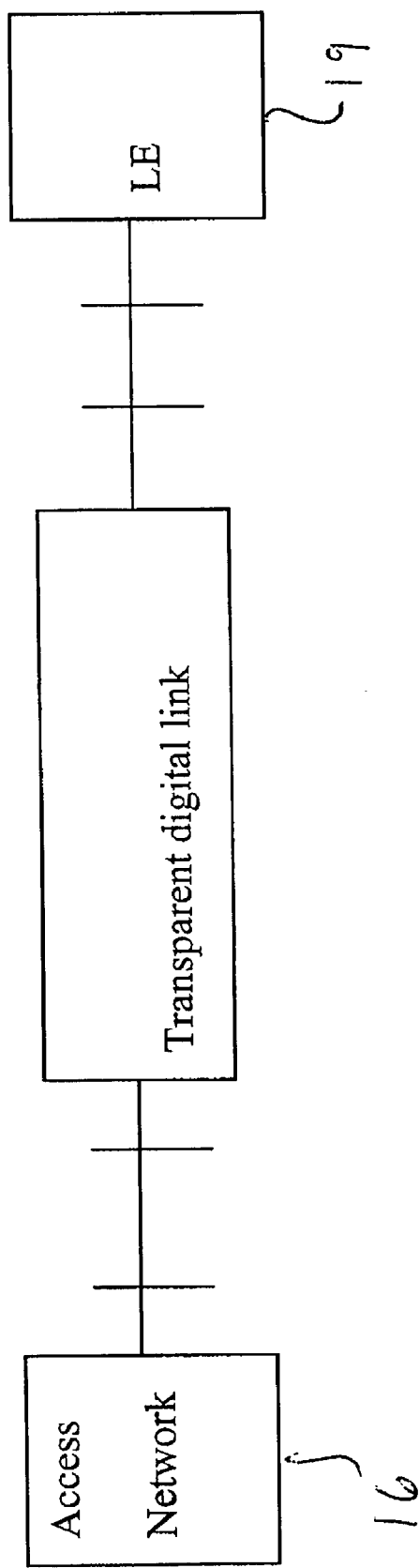
FIG. 3 depicts a second way of coupling an access network to a local exchange to which various aspects of the present invention are applicable.
Figure 4:
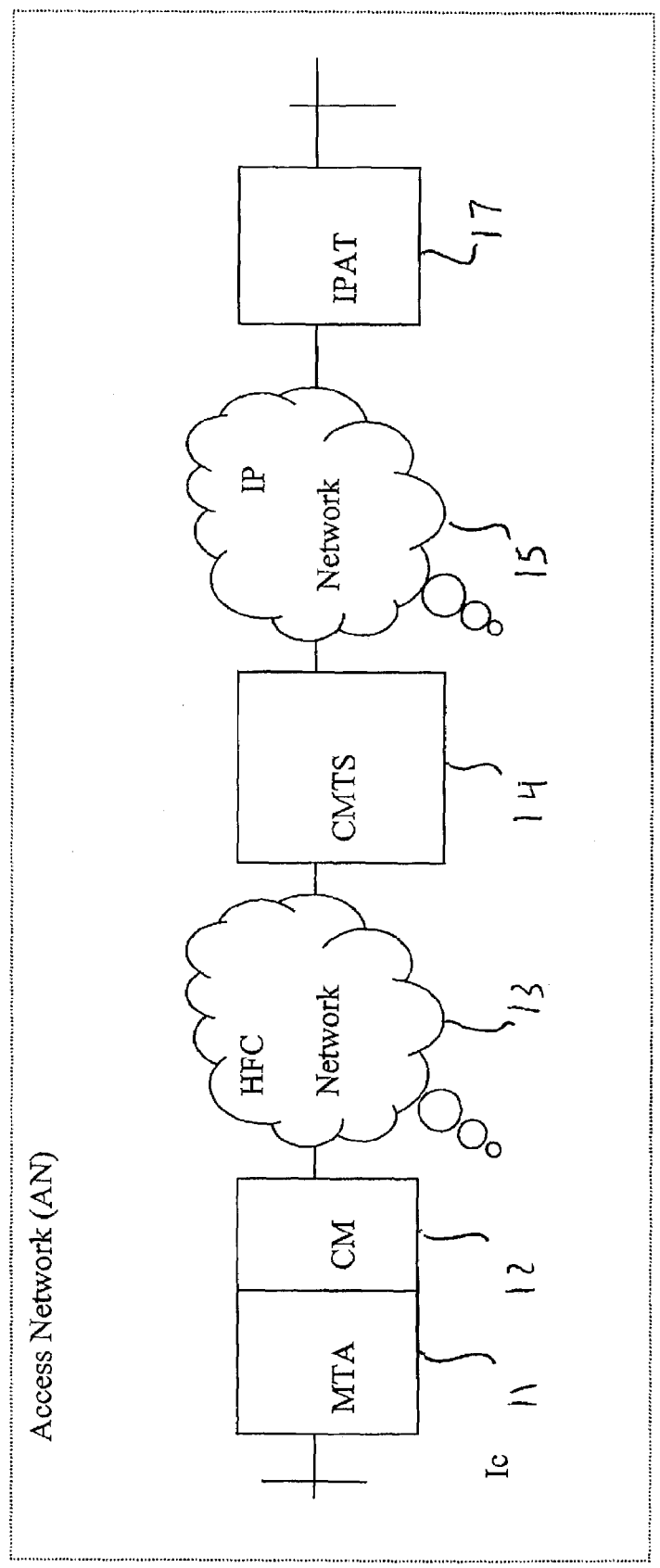
FIG. 4 depicts an exemplary embodiment of an access network to which various aspects of the present invention are applicable.

Herein, the Access Network is expanded to define a PacketCable network consisting of an Internet Protocol Access Terminal (IPAT) or node 17, a Cable Modem Terminal System (CMTS) 14, a Cable Modem (CM) 12a, 12b and a Multimedia Terminal Adapter (MTA) 11a, 11b or an Embedded Multimedia Terminal Adapter (E-MTA). In the FIGS. 1–4, Ia=interface point at the Access Network side; Ib=interface point at the LE side; and Ic=interface point at the user premises side. FIGS. 2, 3 and 4 show various network architectures to which the several inventions herein may be applicable.

This Access Network is synonymous to an access network utilizing a Remote Digital Terminal (RDT) in the traditional Circuit Switch architecture.

The electrical and logical definitions of the IP Network and the HFC Network are the subject of standards activities and are not defined herein.

The description herein assumes that these networks simply provide the transparent digital link as described in ETS 300 324. The description herein focuses on the method of providing the signaling necessary between the V5 LE to the premises interface point as defined in ETS 300 324 in support of the desired services at the user premises termination point.

For cadenced ringing requests, the embodiments herein define an expanded range of cadenced rings using a similar syntax as the NCS ringing cadence signals.

For pulsed and steady state signals, the techniques herein allow a PacketCable IPAT to translate a V5 protocol message received from the V5 switch to a corresponding signal request from the IPAT to the E-MTA specifying the desired signal to be applied to the premises termination point (e.g., line treatment, pulse duration, pulse period and number of repetitions, etc.). The techniques herein also include a means for the IPAT to support the V5 switch requests for acknowledgements.

FIG. 14 depicts a flow chart of an exemplary embodiment of a method for configuring an access device coupled to an Internet Protocol network to apply a desired signal to an access line requested by a local exchange according to one aspect of the present invention. Upon receiving a V5 protocol message from the local exchange requesting the desired signal to be applied to the access line (element 71), the V5 protocol message is mapped into a text message in NCS format containing one or more parameters associated with the desired signal (element 72). The text message is then sent to the access device over the Internet Protocol network (element 73). Upon receipt, the access device adjusts its configuration in accordance with the received text message using the one or more parameters included in the text message and one or more default values stored in a management information base accessible to the access device to define the desired signal (element 74). The access device then applies the desired signal to the access line.

FIGS. 12 and 13 depict a flow chart of an exemplary embodiment for transferring telephony parameters from a local exchange operating in accordance with a V5 protocol to a media terminal adapter operating in accordance with an Internet Protocol according to another aspect of the present invention. Upon receiving a V5 signaling protocol binary message from the local exchange, which received V5 signaling protocol message includes one or more information elements (element 51), the received V5 signaling protocol binary message is mapped into a text message for the remote access node, which text message includes one or more textual information elements corresponding to the one or more information elements in the received V5 signaling protocol binary message (element 52). The text message is then sent to the remote access node (element 53). The mapping includes mapping a V5 ESTABLISH message with a Cadenced Ringing Information Element or a V5 SIGNAL message with a Cadenced Ringing Information Element into an NCS Signal Request message having a cadenced ringing code that includes a textual information element identifying one of a plurality of cadenced ringing types to be employed at the premises termination point in the media terminal adapter (element 53); mapping a V5 ESTABLISH message with a Pulsed Signal Information Element or a V5 SIGNAL message with a Pulse Signal Information Element into an NCS signal request message having a pulse signal code, which includes at least a line treatment information element (element 54); mapping a V5 ESTABLISH message with a Pulsed Signal Information Element or a V5 SIGNAL message with a Pulsed Signal Information Element into an NCS signal request message having a pulse signal code, which includes at least a line treatment information element (element 55); mapping a V5 ESTABLISH message with a Pulsed Signal Information Element into an NCS signal request message having a pulse signal code, which includes at least a line treatment information element (element 56); and mapping a V5 ESTABLISH message with a Steady Signal Information Element or a V5 SIGNAL message with a Steady Signal Information Element into an NCS signal request message having a signal request code of steady signal, which includes one or more information elements (element 57).

The next steps of the method are conditional steps. If the pulse signal code does not include a pulse duration information element, the media terminal adapter applies a pre-provisioned value for the pulse duration, which pre-provisioned value is stored in a management information base accessible by the media terminal adapter (element 58).

If the pulse signal code does not include a pulse repeat interval information element, the media terminal adapter applies a pre-provisioned value for the pulse repeat interval that is stored in a management information base accessible by the media terminal adapter (element 61).

Upon receipt of a suppression indicator from the local exchange indicating no suppression, generating an associated line treatment NCS message to the media terminal adaptor instructing the media terminal adaptor to execute the associated line treatment regardless of changes in a line state or additional signal messages from the processor or local exchange (element 62).

Upon receipt of a suppression indicator from the local exchange indicating no suppression, generating an associated line treatment NCS message to the media terminal adaptor instructing the media terminal adaptor to execute the associated line treatment regardless of changes in a line state or additional signal messages from the processor or local exchange (element 63).

Upon receipt of a suppression indicator from the local exchange indicating suppression in response to a predetermined line signal from the terminal exchange, initiating monitoring for a predetermined NCS line treatment signal message from the media terminal adaptor, and upon receipt of the predetermined NCS line treatment signal message, issuing an associated pulsed signal cancellation message to the media terminal adaptor (element 64).

Upon receipt of a suppression indicator from the local exchange indicating suppression in response to a predetermined V5 signal message from the local exchange or a predetermined line signal from the terminal exchange, initiating monitoring for the predetermined V5 signal message and a predetermined line treatment signal message from the media terminal adaptor, and upon receipt of either the predetermined V5 signal message from the local exchange or the predetermined line treatment signal message from the media terminal adaptor, issuing an associated pulsed signal cancellation message to the media terminal adaptor (element 65).

NCS Package for V5 SCN Protocol Messages

This section describes addition of an IPCablecom signal request and an event request to a presumed European Line Package being developed for NCS in European IPCablecom.

These signal requests and event requests map the corresponding information elements contained in a V5 SCN protocol Message Type, in a binary format, to the NCS format.

Default values given herein are for the purpose of providing equipment vendors with values for initial product shipment. Provisions are provided to allow these values to be overwritten as part of unit configuration or provisioning with alternate values per local administration requirements.

Cadence-Ringing Request

V5 ESTABLISH messages or V5 SIGNAL Messages with Information Elements for "Cadence-ringing" are mapped to the NCS "SignalRequest":

S: <request code>

The signal request code for European Cadenced Ringing signal is cr(x).

The currently defined PacketCable Line Package NCS Ringing signal "rx" is defined with x=g, s or numbers 0–7 (decimal). Some of these cadences are fixed and cannot be provisioned per PacketCable guidance. V5 allows for cadenced rings to range from 0 to 127, therefore, the cr(x) signal request code is defined with x=0, 127. In V5 systems the default cadenced ring is cr(0) and any of the cadences can be uniquely provisioned per national norms or administration requirements.

Cadenced Ringing Defaults and Ranges

The MTA allows the cadenced ringing values (0 through 127) to be provisioned to correspond to the LE cadenced ring map per national norms or local administration requirements.

Cadenced Ring Default Values are given in Table B.1. All timing is in milliseconds. Provisioning across the range of 0 to 5000 ms in steps of 50 ms is required:

TABLE B.1

Cadenced Ring Default Values

| cr(x) | t1 - ring | t2 - idle | t3 - ring | t4 - idle | t5 - ring | t6 - idle |
|---|---|---|---|---|---|---|
| 0 | 1000 | 4000 | 1000 | 4000 | 1000 | 4000 |
| 1 | 1000 | 500 | 1000 | 3500 | 1000 | 3500 |
| 2 | 500 | 500 | 500 | 500 | 1000 | 3000 |
| 3 | 500 | 500 | 1000 | 500 | 500 | 3000 |
| 4 | 1000 | 500 | 500 | 4000 | | |
| 5 | | | | | | |
| 6 | | | | | | |
| 7 | | | | | | |
| 8 | | | | | | |
| ... | | | | | | |
| 127 | | | | | | |

Pulsed Signal Request

The V5 ESTABLISH message with a Pulse Signal Information Element or a V5 SIGNAL Messages with a "Pulsed Signal" Information Element maps to an NCS signal request. The signal request code for pulsed signal is ps. The parameters for this signal request are:

lt denotes the line treatment to be applied (Corresponds to the V5 coding of Pulse Type)

pd denotes the pulse duration (length of a single pulse)

pr denotes pulse repeat interval for the pulses

The pd and pr values are optional. If no values are given the MTA shall apply pre-provisioned values in the MTA MIB per the line treatment/pulse type (lt) type code.

In addition to these parameters, the signal request may be applied with these signal request parameters:

rep denotes the number of pulses (repetitions)

rpc denotes the number of pulses between meter pulse reports (optional, em signal only)

Most pulsed signal requests are, in effect, timeout (TO) signals, in which the timeout value may be determined as:

$$to=pr*rep$$

The IPAT need not include the timeout parameter in the signal request if the default timeout value is adequate for the Signal Request being requested. This default is provisioned in both the MTA and the IPAT.

The IPAT SHOULD include the timeout value if the product of pr*rep is significantly less than 180 seconds, and the IPAT MUST include the timeout value if the product of pr*rep is greater than 180 seconds.

The "enable metering pulse generation" (em) and "burst metering pulse generation" (mpb) signals are defined as on/off (OO) and brief (BR) signals, respectively. The number of pulses (rep) is not applicable to the em signal request. Rather, the em signal only may include the report pulse count (rpc) parameter. The number of pulses parameter is required for the mpb signal request.

Line Treatment Encoding

Table B.2 describes encoding for the line treatments that may be applied, along with signal type and parameter applicability. Parameters may be Optional (O), Mandatory (M) or Forbidden (F).

TABLE B.2

Line Treatment Encoding

| lt Code | Description | Signal Type | pd | pr | rep[1] | rpc |
|---|---|---|---|---|---|---|
| ir | Initial Ring | TO | O | O | O | F |
| lc | Pulsed loop closed | TO | O | O | O | F |
| lo | Pulsed loop open | TO | O | O | O | F |
| em | (Enable) metering pulse generation | OO | F | O | F | O |
| mpb | Metering pulse burst generation | BR | O | O | O | F |
| nb | Pulsed no battery | TO | O | O | O | F |
| np | Pulsed normal polarity | TO | O | O | O | F |
| rb | Pulsed reduced battery | TO | O | O | O | F |
| rp | Pulsed reversed polarity | TO | O | O | O | F |

The "rep" parameter is MANDATORY if value is provided by the V5 LE interface. The assignment of OPTIONAL in this field is in recognition of the use of default values in support of Call Agent or Softswitch architectures.

Line Treatment Defaults and Ranges

Table B.3 shown in FIG. 11 describes defaults and parameter ranges for the line treatments in Table B.2. Timing Values are in milliseconds.

Note 1: Meter Pulse Amplitude is specified in dBm across a-b terminals terminated in the reference termination impedance per national norms.

Requested Events

The following events may be requested for pulsed signals, by inclusion in the requested events (R: parameter list in the notification request:

oc denotes that operation completion should be notified of denotes that operation failure should be notified pc denotes that pulse completion should be notified Pulse Encoding The IPAT must map V5 enumerated pulse type and duration coding to NCS line treatment types and durations in milliseconds per provisioning tables as defined by the LE or the local administration.

Pulse Duration Encoding

The pulse duration is specified in milliseconds, using the pd parameter. For example, a 200 millisecond pulse is specified by:

pd=200

Pulse duration is optional. If not provided by the requesting entity, the MTA SHOULD apply a provisioned or internally defaulted value, based on the line treatment (lt) parameter.

Pulse Period Encoding

The pulse period is specified in milliseconds, using the pr parameter. For example, a one second period is specified by:

pr=1000

Thus, for example, a 50% duty cycle, a one second periodic pulse is specified by:

pd=500, pr=1000

Pulse period is optional. If not provided by the requesting entity, the MTA SHOULD apply a provisioned or internally defaulted value, based on the line treatment (lt) parameter.

Pulse Completion Event Coding

The pulse completion event is reported by the MTA when requested in the first Signal Request by the IPAT and when each requested pulse is completed. This event is notified for each completed pulse for the duration of the signal request, without requiring additional notification requests from the IPAT. Detection of this event does not affect continued application of pulses by the MTA.

The event request code for pulse complete is pc, and is included in the signal request, similar to the operation complete oc event.

Metering Pulse Report Coding

The metering pulse report event is reported by the MTA when requested in an enable metering pulse generation signal request with non-zero report pulse count (rpc) parameter. This event is notified each time the MTA's metering pulse count reaches the report pulse count. Generation of the event resets the MTA's metering pulse count to zero. The count does not include pulses generated by any metering pulse burst (mpb) signal requests. Generation of the event does not affect continued generation of metering pulses and subsequent metering pulse report event notification. The IPAT does not need to send a new notification request.

The event code for the metering pulse report is mpr. The notification includes the count. Example:

O:mpr(10)

V5 Suppression Indicator

The V5 suppression indicator is used both in the Pulsed-Signal IE and in the Enable-Metering IE. It allows the LE to indicate to the Access Network whether the ongoing pulsed signal shall be suppressed.

The suppression indicator shall be used to indicate whether the pulse generation shall be stopped in a network if the line conditions change, if a new SIGNAL message is received from the LE or if either occurs. This is especially important for meter pulses in some networks, where metering pulses are not sent after the call is cleared, this could be used to suppress metering pulses after the call has been cleared.

In other networks it is essential that the meter pulses are sent out regardless of either a change in line state due to messages from the LE or changes due to the TE.

The coding of suppression indicator is:
00 No suppression
01 Suppression allowed by pre-defined V5.1 SIGNAL message from LE
10 Suppression allowed by pre-defined line signal from TE
11 Suppression allowed by pre-defined V5.1 SIGNAL message from LE or pre-defined line signal from TE The signal suppression option does not map efficiently to the NCS protocol. For example, to apply a signal request with "no suppression," the signal must be defined as a "brief" signal; to apply a signal with "suppression allowed by pre-defined signal from TE" requires that the signal must be defined as a "timeout" signal. For the purposes of V5-to-NCS inter-working, the NCS behavior is accepted, and the signals are defined based on assumptions of normal usage.

To resolve this conflict with NCS the IPAT must "bridge" the V5 protocol to NCS by accepting the V5 Suppression Indication and then executing the appropriate set of NCS messages to achieve the desire affect.

No Suppression

Upon receipt of the V5 "00" code, the IPAT shall generate the associated line treatment NCS message to the MTA. The MTA shall execute the associated line treatment as defined herein regardless of changes in the line state or additional signal messages from the LE-IPAT.

Suppression by Pre-Defined V5 Signal Message

For this case the IPAT must be pre-provisioned with the associated V5 SIGNAL message (e.g. far end "on hook").

Upon receipt of the V5 "01" code, the IPAT shall begin monitoring for the pre-provisioned V5 SIGNAL message. The MTA shall execute the associated line treatment as defined herein.

Upon receipt of the pre-provisioned V5 SIGNAL message, the IPAT shall issue the associated pulsed signal cancellation message to the MTA.

The MTA shall respond to the associated pulsed signal cancellation message as defined herein.

Suppression by Pre-Defined Line Signal From TE

For this case the IPAT must be pre-provisioned with the associated NCS line treatment signal message (e.g. "on hook").

Upon receipt of the V5 "10" code, the IPAT shall begin monitoring for the pre-provisioned NCS line treatment signal message form the MTA.

The MTA shall execute the associated line treatment message as defined by NCS protocols (e.g. "on hook").

Upon receipt of the pre-provisioned NCS line treatment message, the IPAT shall issue the associated pulsed signal cancellation message (see Section B.4.5) to the MTA.

The MTA shall respond to the associated pulsed signal cancellation message as defined herein.

Suppression by Pre-Defined V5 SIGNAL Message From LE or Pre-Defined Line Signal From TE For this case the IPAT must be pre-provisioned with an associated V5 SIGNAL message AND the associated NCS line treatment signal message (e.g. far end "on hook" AND TE "on hook").

Upon receipt of the V5 "11" code, the IPAT shall begin monitoring for the pre-provisioned V5 SIGNAL message and shall begin monitoring for the pre-provisioned NCS line treatment signal message from the MTA.

If presented to the MTA the MTA shall execute the associated line treatment message as defined by NCS protocols (e.g. "off hook").

Upon receipt of the pre-provisioned V5 SIGNAL message OR the NCS line treatment message from the MTA, the IPAT shall issue the associated pulsed signal cancellation message to the MTA.

The MTA shall respond to the associated pulsed signal cancellation message as defined herein.

Repetition indicator

The repetition indicator is only used in the V5 Enable-Metering IE. It is sent in the direction of LE to Access Network with a reporting pulse count to instruct the Access Network whether to continue or cease application of automatic metering pulses when the number specified in reporting pulse count have been applied. Coding of repetition indicator:

00 Cease to apply pulses after number specified by reporting pulse count have been applied 11 Continue to apply pulses at same rate until the call is disconnected or receipt of new instructions from LE 01 Reserved for Other use.

10 Reserved for Other use.

The default behavior for the em line treatment provides for the signal to be applied as an on/off signal until discontinued by the IPAT. The IPAT can obtain the behavior of discontinuing the pulses once the reporting pulse count has been reached by including an embedded notification request to turn off the em signal (see Section B.4.5).

Pulse Repetition Encoding

The IPAT maps the V5 interface pulse repetition count directly to the existing NCS repetition (rep) parameter.

This parameter must be provided in accordance with this Annex. There is no default value for pulse repetitions.

Note: Per V5 guidance, a rep value of "0" is invalid. If the IPAT receives a request from the V5 LE with a rep value=0, or missing, the IPAT shall substitute a rep value of "1".

In the V5 Pulsed-Signal IE, the "number of pulses" field is a 5-Bit field. The range of permitted values is 1 through 31. In the V5 Enable-Metering IE, the combination of "repetition indicator=00" and "reporting pulse count" fields also allow for the specification of a limited "number of pulses". Reporting pulse count is a 12-Bit field, accounting for a valid range from 1 through 4095. While the pulse repetition value may only be in the range 1 . . . 31 from a V5 interface, pulse repetitions may be specified over the full range 1 . . . 4095.

Parameter Usage

All of the parameters described for the pulsed signal request apply to all of the described line treatments.

The IPAT must supply values for the pulse duration, the pulse repetition interval, and the number of repetitions.

To account for national variation for meter pulse, the frequency and amplitude are provisioned to the MTA because neither is provided in the message from the V5 interface. The IPAT must determine the pulse repetition interval from the V5 interface message rate type and provide the interval time (ms) to the MTA in the signal request.

In V5–2000, the Enable-Metering information element has a rate type field. This is an enumeration type. The IPAT must translate the different enum values to corresponding millisecond values, based on its provisioning, depending on the local administration.

The IPAT may use the pulse repetition interval and signal repetition parameter to generate a fixed number of pulses to the subscriber's line.

Pulsed Signal Cancellation

Most pulsed signals, being timeout signals, are terminated when any requested event is detected, except for pulse completion (pc).

In addition, the LE may terminate all active pulsed signals at any time by sending an empty Signal Request.

Since the LE may apply multiple pulsed signals to a subscriber's line simultaneously, (for example, meter pulse is being generated and another line treatment is applied), the IPAT may terminate an on/off line treatment with treatment specific command syntax. An example to terminate the applied meter pulse would be:

S: E/ps(em(-))

Pulsed Completion Event

The pulsed completion event is reported by the MTA to the IPAT when each requested pulse is completed.

The event request code for pulse complete is pC.

Pulsed Signal Failure Event

The pulsed signal failure event is reported by the MTA to the IPAT when any pulsed signal request fails to complete, if operation failure 'of' has been included in the list of requested events. A pulsed signal request may fail for any reason that any other signal request might fail.

Steady-Signal Request

The V5 ESTABLISH message with a Steady Signal Information Element or a V5 SIGNAL message with a Steady Signal Information Element maps to an NCS signal request.

The signal request code for steady signal is ss. The parameters for this signal request are:

lt denotes the line treatment to be applied (Corresponds to the V5 coding of Steady-signal Type)

This treatment is maintained until the V5 LE directs for a new treatment.

Line Treatment Encoding

Line treatments are encoded using the following code words:

Steady Signal Request Encoding

| lt Code | Description |
| --- | --- |
| fb | normal (full) battery |
| lc | loop closed |
| lo | loop open |
| nb | no battery |
| np | normal polarity |
| rb | reduced battery |
| rp | reversed polarity |

Line Treatment Provisioning

There is no provisioning required in that these are line states without quantitative values (timing, frequency or amplitude).

Metering Pulse Generation

On receiving an "enable metering pulse generation" ps(lt=em(+)) signal request the MTA shall apply the first metering pulse to the termination immediately, and then apply subsequent metering pulses at intervals as specified by the value of the pulse repetition interval parameter pr, if supplied in the signal request, or the provisioned value.

The MTA shall continue to generate metering pulses until it receives an "disable metering pulse generation" ps(lt=em (-)) signal request, or an empty signal request list.

A metering pulse burst signal ps(lt=mpb) request may be included in a signal request that also enables metering pulse generation, for example, to apply an initial charge to a call. When this occurs, the MTA shall apply the metering pulse burst to the endpoint completely, and then start generating normal metering pulses.

Because the metering pulse burst signal is a brief signal type, all pulses specified to for the request (rep=n) are applied, even if the subscriber goes on-hook during the burst.

A metering pulse burst signal request may occur during a call in progress, for example to take account of a chargeable subscriber action. When this occurs, the MTA shall suspend normal metering pulse generation, and apply the metering pulse burst signal request. The MTA then shall resume normal metering pulse generation without requiring a new "enable metering pulse generation" request from the IPAT. The IPAT must account for any normal metering pulses missed during the burst by including the missed pulses in the burst count.

The IPAT may optionally include a report pulse count (rpc) parameter with the enabling metering pulse generation (em) signal request. When this parameter is non-zero (rpc=n, where n=1 to x), the MTA generates meter pulse reports, in the form of notifications, each time its pulse count reaches the rpc value. Generation of the event notification resets a rpc counter so that a report will be generated each time the rpc "n" value is reached. This count does not include any metering pulses generated by metering pulse burst (mpb) signal requests.

Provisioning Configurations

MTA

The MTA shall be provisioned with electrical parameters for each of the Line Treatments. When appropriate, these parameters include, amplitude, frequency, minimum pulse widths and maximum rep rate (minimum inter-pulse timing). These parameters are to be used unless line treatment specific values are provided by the V5 interface messages.

IPAT

Shall be provisioned with V5 pulse type and duration coding mapping to NCS pulse type and pulse duration timing in milliseconds. This provisioning must be consistent with the LE provisioning and the local administration guidance.

European Line Package Support

NCS Audit

The NCS Audit Endpoint (AUEP) command allows the MTA to report signals that it supports.

In response to an AUEP, an MTA that supports any of the signaling requests listed herein must report support of this "European" package (designated with an "E" code).

An example of an audit exchange:

AUEP 1232 aaln/1@rgw.mso.net
F: A
MTA responds:
200 1232 OK
A: a:PCMU,
p:30–90,
v:L;E,
m:sendonly;recvonly;sendrecv;inactive,
DQ-GI, SC-ST, SC-RTP: 00/51;03

The important line for packages is the "v:L;E" which indicates support for the NCS Line Package (L) and for the European line package (E).

Unsupported Signals—PICS Declaration

This is an indication of a device platform limitation (hardware or software) and is not an error condition. Product vendors may reflect any unsupported signals listed herein in the product PICS declaration. NCS provides a messaging facility where as, if the device cannot support the requested signal type, the device can return an "unsupported signal" response (513 code).

EXAMPLE 1

CMS->MTA (requesting a metering pulse burst):
RQNT 9915 aaln/1@rgw.mso.net MGCP 1.0 NCS 1.0
X: 2255
S: E/ps(lt=mpb, pd=500, pr=1000, rep=5)
R: oc, hu, hf
MTA->CMS (rejecting the request):
513 9915 Unsupported Signal in Signal Request

EXAMPLE 2

CMS->MTA (requesting metering enable, using provisioned defaults):
RQNT 9915 aaln/1@rgw.mso.net MGCP 1.0 NCS 1.0
X: 2255
S: E/ps(lt=em(+))
R: E/pc, hu, hf
MTA->CMS (rejecting the request):
513 9915 Unsupported Signal in Signal Request

CALL FLOW EXAMPLES

Cadenced Ringing

Cadenced Ringing—Basic Cadenced Ring

This flow illustrates a request for the application of a simple cadenced ring.
1. The LE includes a cadence-ringing pulsed signal request in a message to the IPAT. The IPAT converts the binary coded cadence-ring to a decimal value between 0 and 127
2. Assuming the cadence-ring value is converted to a decimal number "0":
   RQNT 500 aaln/1@rgw.mso.net MGCP 1.0 NCS 1.0
   S: E/cr(0)
3. The MTA acknowledges the signal request.
   200 500 OK
4. The MTA looks up in its provisioned ring table for the cr(0) definition of ring frequency and cadenced ring and applies it to the a-b terminals for the aaln/1 line presence on the MTA. This cadence continues until the MTA detects Off Hook at which time it begins the normal NCS connect sequence or until the IPAT signals a disconnect message.

Cadenced Ringing—Ring Splash Followed by a Cadenced Ring

This Call flow demonstrates the use of a pulsed signal "initial ring" type followed by a cadenced ring to provide a "ring splash" followed by a cadenced ring.
1. The LE supplies an "initial ring" pulsed signal type request with a pulse duration type in a message to the IPAT.
2. The IPAT converts the "initial ring" type to the NCS lt type ir, with the pulse duration value and requests operation complete notification.
   RQNT 510 aaln/1@rgw.mso.net MGCP 1.0 NCS 1.0
   X: 000691
   S: E/ps (lt=ir, pd=200, rep=1)
   R: oc
3. The MTA acknowledges the signal request.
   200 691 OK
4. The MTA looks up in its provisioned ring table for the ir definition of initial ring frequency and initial ring duration (pd=200 results in a ring burst of 200 ms) and applies it to the a-b terminals for the aaln/1 line presence on the MTA.
5. Upon completion of the initial ring the MTA responds with an operation complete message
6. NTFY 1298 aaln/1@rgw.mso.net MGCP 1.0 NCS 1.0
   X: 691
   O: oc(E/ps(ir))
   Note that this assumes a "European Line Package" designated by the name "E". The package name could be omitted if this package is the default package.
7. The IPAT signals the LE that the pulse is complete
8. The LE includes a cadence-ringing pulsed signal request in a message to the IPAT.
9. The IPAT converts the binary coded cadence-ring to a decimal value between 0 and 127
10. Assuming the cadence-ring value is converted to a decimal number "0":
    RQNT 520 aaln/1@rgw.mso.net MGCP 1.0 NCS 1.0
    X: 699
    S: E/cr(0)
11. The MTA acknowledges the signal request.
    200 520 OK
12. The MTA looks up in its provisioned ring table for the cr(0) definition of ring frequency and cadenced ring and applies it to the a-b terminals for the aaln/1 line presence on the MTA. This cadence continues until the MTA detects Off Hook at which time it begins the normal NCS connect sequence or until the IPAT signals a disconnect message.

Cadenced Ringing—Ring Splash Followed by "on hook" Data, then Cadenced Ring

This flow illustrates an "on hook" data transmission associated with ringing (CLID). A ring burst preceding LE generated FSK signaling tones followed by the application of a cadenced ring.
1. The LE supplies an "initial ring" pulsed signal type request with a pulse duration type in a message to the IPAT.
2. The IPAT converts the "initial ring" type to the NCS lt type ir, with the pulse duration value and requests operation complete notification.
   RQNT 530 aaln/1@rgw.mso.net MGCP 1.0 NCS 1.0
   X: 777
   S: E/ps (lt=ir, pd=200, rep=1)
   R: oc
3. The MTA acknowledges the signal request.
   200 530 OK
4. The MTA looks up in its provisioned ring table for the ir definition of initial ring frequency and initial ring duration (pd=200 results in a ring burst of 200 ms) and applies it to the a-b terminals for the aaln/1 line presence on the MTA.
5. Upon completion of the initial ring the MTA responds with an operation complete message
   NTFY 1298 aaln/1@rgw.mso.net MGCP 1.0 NCS 1.0
   X: 777
   O: oc (E/ps (ir))
   Note that this assumes a "European Line Package" designated by the name "E". The package name could be omitted if this package is the default package.

6. The IPAT signals the LE that the pulse is complete
7. The LE then generates the FSK tones in band to the aaln/1 termination.
8. The MTA plays through the in band FSK tones to the aaln/1 analogue POTS line.
9. The LE times from the end of the FSK tone a 200 ms delay (to meet the minimum requirements of ETSI EN 300 659-1) and then generates a cadence-ringing pulsed signal request in a message to the IPAT.
10. The IPAT converts the binary coded cadence-ring to a decimal value between 0 and 127
11. Assuming the cadence-ring value is converted to a decimal number "0":
    RQNT 540 aaln/1@rgw.mso.net MGCP 1.0 NCS 1.0
    X: 778
    S: E/cr(0)
12. The MTA acknowledges the signal request.
    200 540 OK
13. The MTA looks up in its provisioned ring table for the cr(0) definition of ring frequency and cadenced ring and applies it to the a-b terminals for the aaln/1 line presence on the MTA. This cadence continues until the MTA detects Off Hook at which time it begins the normal NCS connect sequence or until the IPAT signals a disconnect message.

Pulsed Signal Request

A method 40 for implementing a pulsed signal request is shown in FIG. 4.

Pulse Signal Request for One Loop Open Pulse

1. The LE 19 includes a loop open pulsed signal request in a message to the IPAT 17.
2. The IPAT 17 converts the binary coded V5 message and determines the line treatment and pulse duration from parameters supplied by the LE, and generates an appropriate NCS signal request.
    RQNT 525 aaln/1@rgw.mso.net MGCP 1.0 NCS 1.0
    X: 795
    S: E/ps(lt=lo, pd=200, rep=1)
3. The MTA 11 acknowledges the signal request.
    200 525 OK
4. The MTA 11 applies a 200 millisecond open loop to the subscriber's access line 21.

Pulsed Signal with Start Acknowledgement

FIG. 5 shows a method 50 for implementing a pulsed signal with start acknowledgement. This call flow illustrates a pulsed signal request with multiple pulses, and in which the LE 19 has requested acknowledgement when the signal application to the subscriber's access line starts 21.

1. The LE 19 requests an open loop with multiple pulses and start acknowledgement.
2. The IPAT 17 converts the binary coded V5 message and determines the line treatment, pulse duration and pulse period from parameters supplied by the LE, and generates an appropriate NCS signal request, including the number of pulse repetitions supplied by the LE 19. The IPAT 17 must "remember" that the LE has requested signal start acknowledgement.
    RQNT 525 aaln/1@rgw.mso.net MGCP 1.0 NCS 1.0
    X: 919
    S: E/ps(lt=lo, pd=200, pr=1000, rep=3)
3. The MTA 11 acknowledges the signal request.
    200 525 OK
4. The IPAT 17 sends acknowledgement to the LE 19.
5. The MTA 11 starts applying the open loop pulses to the subscriber's access line 21.

Pulsed Signal With Completion Acknowledgement

FIG. 6 shows a method 60 for implementing a pulsed signal with completion acknowledgement. This call flow illustrates a pulsed signal request in which the LE 19 has requested acknowledgement after all pulses have been applied.

1. The LE 19 requests an open loop with multiple pulses and completion acknowledgement.
2. The IPAT 17 converts the binary coded V5 message and determines the line treatment and pulse duration from parameters supplied by the LE 19, and generates an appropriate NCS signal request, including the number of pulse repetitions supplied by the LE 19. Because the LE 19 also requested completion acknowledgement, the IPAT includes the operation complete parameter in the signal request. For the sake of this example, assume also that the LE 19 requested start acknowledgement.
    RQNT 525 aaln/1@rgw.mso.net MGCP 1.0 NCS 1.0
    X: 942
    S: E/ps(lt=lo, pd=200, pr=1000, rep=3)
    R: oc
3. The MTA 11 acknowledges the signal request.
    200 525 OK
4. The MTA 11 starts applying the requested pulses to the line.
5. $2^{nd}$ pulse
6. $3^{rd}$ pulse
7. With the last pulse completed, the MTA 11 notifies the IPAT 17 that the operation is complete.
    NTFY 1298 aaln/1@rgw.mso.net MGCP 1.0 NCS 1.0
    X: 942
    O: oc(E/ps(lo))
    Note that this assumes a "European Line Package" designated by the name "E". The package name could be omitted if this package is the default package.
8. The IPAT 17 sends the requested acknowledgement to the LE 19.
9. The IPAT 17 acknowledges the event notification to the MTA 11.

Pulsed Signal With Pulse Acknowledgement

FIG. 8 shows a method 70 for implementing a pulsed signal with pulse acknowledgement. This call flow illustrates a pulsed signal request in which the LE has requested acknowledgement after each pulse is applied.

1. The LE 19 requests an open loop with multiple pulses and pulse acknowledgement.
2. The IPAT 17 converts the binary coded V5 message and determines the line treatment and pulse duration from parameters supplied by the LE 19, and generates an appropriate NCS signal request, including the number of pulse repetitions supplied by the LE 19. Because the LE 19 also requested pulse acknowledgement, the IPAT 17 includes an embedded signal request for the pc signal.
    RQNT 525 aaln/1@rgw.mso.net MGCP 1.0 NCS 1.0
    X: 1111
    S: E/ps(lt=lo, pd=200, pr=1000, rep=3)
    R: E/pc
3. The MTA 11 acknowledges the signal request.
    200 525 OK
4. The MTA 11 applies the first pulse to the subscriber's access line 21.
5. When the pulse completes, the MTA 11 sends an event notification to the IPAT 17.
    NTFY 3981 aaln/1rgw.mso.net MGCP 1.0 NCS 1.0

X: 1111
O: E/pc(lt)
6. The IPAT 17 sends the pulse acknowledgement to the LE 19.
7. The IPAT 19 acknowledges the event notification. The IPAT 17 does not need to send a new notification request for pulse completion. This request remains in effect until metering pulse generation is completed.
8. The MTA 11 continues to transmit pulses and notify pulse completions.

Pulsed Signal—Meter Pulse With Pulse Acknowledgement

FIG. 9 shows the call flow 80 of a pulsed signal request in which the LE 19 has requested application of meter pulse with acknowledgement after each pulse is applied. The Meter Pulse frequency has been provisioned to the MTA 11.

1. The LE 19 requests enable metering pulse generation and pulse acknowledgement.
2. The IPAT 17 converts the binary coded V5 message and generates an appropriate NCS signal request. Because the LE 19 also requested pulse acknowledgement, the IPAT 17 includes the pc parameter with the signal request.
   RQNT 535 aaln/1rgw.mso.net MGCP 1.0 NCS 1.0
   X: 2345
   S: E/ps(lt=em(+))
   R: E/pc
3. The MTA 11 acknowledges the signal request.
   200 535 OK
4. The MTA 11 refers to its provisioning table to determine the meter pulse frequency, amplitude and default timings, and applies the first meter pulse to the subscriber's access line.
5. When the pulse completes, the MTA sends an event notification to the IPAT.
   NTFY 3981 aaln/1@rgw.mso.net MGCP 1.0 NCS 1.0
   X: 535
   O: pc(em)
6. The IPAT sends the pulse acknowledgement to the LE.
7. The IPAT acknowledges the event notification.
8. The MTA continues to transmit pulses and notify pulse completions until the LE discontinues metering pulse generations:
   RQNT 599 aaln/1@rgw.mso.net MGCP 1.0 NCS 1.0
   S: E/ps(lt=em(−))

Pulsed Signal—Meter Pulse With Pulse Acknowledgement With Tariff Change

This call flow illustrates a pulsed signal request in which the LE has requested application of meter pulse with acknowledgement. After several pulses in the first string are applied, a tariff change is invoked. The Meter Pulse frequency has been provisioned to the MTA.

1. The LE request application of meter pulse with multiple pulses and pulse acknowledgement.
2. The IPAT converts the binary coded V5 message and determines the line treatment and pulse duration from parameters supplied by the LE and generates an appropriate NCS signal request, including the number of pulse repetitions supplied by the LE. Because the LE also requested pulse acknowledgement, the IPAT includes an embedded signal request for the pc signal
   RQNT 545 aaln/1@rgw.mso.net MGCP 1.0 NCS 1.0
   X: 3579
   S: E/ps(lt=em(+), pd=150, pr=1000)
   R: E/pc
3. The MTA acknowledges the signal request.
   200 545 OK
4. The MTA refers to its provisioning table to determine the meter pulse frequency, amplitude and default timings (minimum allowed values).
5. The IPAT relays the start acknowledgement to the LE. Can't have both start ack and per-pulse ack.
6. The MTA applies the first meter pulse to the subscriber's access line.
7. When the pulse completes, the MTA sends an event notification to the IPAT.
   NTFY 3981 aaln/1@rgw.mso.net MGCP 1.0 NCS 1.0
   X: 3579
   O: pc(em)
8. The IPAT sends the pulse acknowledgement to the LE.
9. The IPAT acknowledges the event notification. The IPAT does not need to send a new notification request for pulse completion. This request remains in effect until metering pulse generation is completed.
10. The MTA continues to transmit pulses and notify pulse completions. As the result in a change in the call state (e.g. start up of three way call) the LE determines that a new tariff is to be applied. Based on the new tariff, the LE determines a new meter pulse rate.
11. The LE request application of meter pulse with a new multiple pulse count and start acknowledgement.
12. The IPAT converts the new binary coded V5 message and determines the line treatment and pulse duration from parameters supplied by the LE and generates an appropriate NCS signal request, including the number of pulse repetitions supplied by the LE. Because the LE also requested pulse acknowledgement, the IPAT includes an embedded signal request for the pc signal. For the sake of this example, assume also that the LE requested start acknowledgement.
    RQNT 547 aaln/1@rgw.mso.net MGCP 1.0 NCS 1.0
    X: 3581
    S: E/ps(lt=em(+), pd=150, pr=500)
    R: E/pc
13. The MTA acknowledges the signal request.
    200 547 OK
14. The MTA refers to its provisioning table to determine the meter pulse frequency, amplitude and default timings (minimum allowed values).
15. The IPAT relays the start acknowledgement to the LE.
16. The MTA applies the first new meter pulse to the subscriber's access line with the new pulse rate.
17. When the pulse completes, the MTA sends an event notification to the IPAT.
    NTFY 791 aaln/1rgw.mso.net MGCP 1.0 NCS 1.0
    X: 3581
    O: pc(em)
18. The IPAT sends the pulse acknowledgement to the LE.
19. The IPAT acknowledges the event notification.
20. The MTA continues to transmit pulses and notify pulse completions.

Fixed Meter Pulse Application, Completed

FIG. 10 shows a fixed meter pulse application 90, completed. This call flow 90 illustrates meter pulse application with operation complete notification.

1. The LE requests application of twenty-five (25) meter pulses to the subscriber's access line, with pulse duration of 150 milliseconds and repetition interval of 2000 milliseconds. The Meter Pulse frequency has been provisioned to the MTA.
2. The IPAT requests application of the meter pulse signal by the MTA.
   RQNT 2367 aaln/1rgw.mso.net MGCP 1.0 NCS 1.0

X: 7632
S: E/ps(lt=mpb, pd=150, pr=2000, rep=25)
R: oc, hu, hf
3. The MTA acknowledges the request.
4. The MTA begins applying meter pulses to the subscriber's access line.
5. In this example, the LE requested notification on operation completion in the original request to generate the fixed number of meter pulses. The MTA now notifies the IPAT that the operation is complete.
NTFY 12876 aaln/1rgw.mso.net MGCP 1.0 NCS 1.0
X: 7632
O: oc(E/ps(mpb))
6. The IPAT acknowledges the event notification.
7. The IPAT relays the pulsed signal completion acknowledgement to the LE.

Steady Signal Line Treatment

Steady Signal Line Treatment—Reverse Polarity.

This call flow illustrates a Steady Signal request in which the LE has requested reverse polarity to be applied to the a-b POTS terminals.
1. The LE includes a reverse polarity steady signal request in a message to the IPAT.
2. The IPAT converts the binary coded V5 message and maps the binary coded reverse polarity treatment message to the NCS lt message and sends the line treatment message to the MTA.
RQNT 550 aaln/1rgw.mso.net MGCP 1.0 NCS 1.0
S: E/ss(lt=rp)
3. The MTA acknowledges the signal request.
200 550 OK
4. The MTA applies a reverse polarity to the a-b terminals for the aaln/1 line presence on the MTA.

Although various embodiments are specifically illustrated and described herein, it will be appreciated that modifications and variations of the invention are covered by the above teachings and are within the purview of the appended claims without departing from the spirit and intended scope of the invention. For example, some embodiments in this disclosure utilize NCS messages. As NCS is a profile of MGCP anyone knowledgeable in the art could apply the same messages, principles and practices with that protocol or any one of a number of other protocols, such as DCS or H.323. Furthermore, these examples should not be interpreted to limit the modifications and variations of the invention covered by the claims but are merely illustrative of possible variations.

What is claimed is:

1. A method for transferring telephony parameters from a local exchange operating in accordance with a V5 protocol to a media terminal adapter operating in accordance with an Internet Protocol comprising:
receiving a V5 signaling protocol binary message from the local exchange, which received V5 signaling protocol message includes one or more information elements;
mapping the received V5 signaling protocol binary message into a text message for the remote access node, which text message includes one or more textual information elements corresponding to the one or more information elements in the received V5 signaling protocol binary message; and
sending the text message to the remote access node.

2. The method according to claim 1, further comprising mapping a V5 ESTABLISH message with a Cadenced Ringing Information Element or a V5 SIGNAL message with a Cadenced Ringing Information Element into an NCS Signal Request message having a cadenced ringing code that includes a textual information element identifying one of a plurality of cadenced ringing types to be employed at the premises termination point in the media terminal adapter.

3. The method according to claim 1, further comprising mapping a V5 ESTABLISH message with a Pulsed Signal Information Element or a V5 SIGNAL message with a Pulsed Signal Information Element into an NCS signal request message having a pulse signal code, which includes at least a line treatment information element.

4. The method according to claim 3, wherein said pulse signal code also includes a pulse duration information element.

5. The method according to claim 3, wherein said pulse signal code also includes a pulse repeat interval information element.

6. The method according to claim 3, wherein if the pulse signal code does not include a pulse duration information element, the media terminal adapter applies a pre-provisioned value for the pulse duration, which pre-provisioned value is stored in a management information base accessible by the media terminal adapter.

7. The method according to claim 3, wherein if the pulse signal code does not include a pulse repeat interval information element, the media terminal adapter applies a pre-provisioned value for the pulse repeat interval that is stored in a management information base accessible by the media terminal adapter.

8. The method according to claim 3, wherein the pulse signal code also includes a repetition information element denoting a number of pulse repetitions.

9. The method according to claim 8, wherein the pulse signal code also includes a report pulse count information element denoting a number of pulses between meter pulse reports.

10. The method according to claim 3, wherein said line treatment information element includes a value identifying one of the following line treatments: an initial ring, a pulse loop closed, a pulse loop open, an enable metering pulse generation, a metering pulse burst generation, a pulsed no battery, a pulsed normal polarity, a pulsed reduced battery, and a pulsed reverse polarity.

11. The method according to claim 1, further comprising requesting information relating to a signal request from the media terminal adapter by sending with the signal request message to the media terminal adapter an event request message, which includes a textual information element that identifies the related information that is being requested.

12. The method according to claim 11, wherein the textual information element includes a value identifying a pulse completion.

13. The method according to claims 11, wherein the textual information element includes a value identifying one or more of the following events: operation completion and operation failure.

14. The method according to claim 11, further comprising receiving in response to an event request message a notification message, which includes an event request code indicating an event to which the notification message relates.

15. The method according to claim 14, wherein the event request code includes a value indicating a number related to the event to which the notification message relates.

16. The method according to claim 1, wherein upon receipt of a suppression indicator from the local exchange indicating no suppression, generating an associated line treatment NCS message to the media terminal adaptor instructing the media terminal adaptor to execute the associated line treatment regardless of changes in a line state or additional signal messages from the processor or local exchange.

17. The method according to claim 1, wherein upon receipt of a suppression indicator from the local exchange indicating suppression in response to a predetermined V5 signal message from the local exchange, initiating monitoring for the predetermined V5 signal message, and upon receipt of the predetermined V5 signal message, issuing an associated pulsed signal cancellation message to the media terminal adaptor.

18. The method according to claim 1, wherein upon receipt of a suppression indicator from the local exchange indicating suppression in response to a predetermined line signal from the terminal exchange, initiating monitoring for a predetermined NCS line treatment signal message from the media terminal adaptor, and upon receipt of the predetermined NCS line treatment signal message, issuing an associated pulsed signal cancellation message to the media terminal adaptor.

19. The method according to claim 1, wherein upon receipt of a suppression indicator from the local exchange indicating suppression in response to a predetermined V5 signal message from the local exchange or a predetermined line signal from the terminal exchange, initiating monitoring for the predetermined V5 signal message and a predetermined line treatment signal message from the media terminal adaptor, and upon receipt of either the predetermined V5 signal message from the local exchange or the predetermined line treatment signal message from the media terminal adaptor, issuing an associated pulsed signal cancellation message to the media terminal adaptor.

20. The method according to claim 1, further comprising mapping a V5 ESTABLISH message with a Steady Signal Information Element or a V5 SIGNAL message with a Steady Signal Information Element into an NCS signal request message having a signal request code of steady signal, which includes one or more information elements.

21. The method according to claim 20, wherein the one or more information elements includes a line treatment information element indicating a line treatment to be applied by the media terminal adaptor until receiving a new signal request message from the processor.

22. The method according to claim 21, wherein said line treatment information element includes a value identifying one of the following line treatments: normal (full) battery, loop closed, loop open, no battery, normal polarity, reduced battery, and reversed polarity.

23. An apparatus for coupling a local exchange to a media terminal adapter whereby the local exchange can instruct a media terminal adapter to apply a desired signal at a premises termination point in the medial terminal adapter, said apparatus comprising:
a V5 interface for coupling to the local exchange and to receive V5 SCN protocol messages in binary format;
an Internet Protocol interface for coupling to the media terminal adapter via an Internet Protocol network and to send and receive text messages in NCS format to and from the media terminal adapter; and
a processor coupled to the V5 interface and coupled to the Internet Protocol interface to map one or more information elements included in any received V5 SCN protocol messages in a binary format into one or more NCS formatted signal requests and/or one or more NCS event requests to send to the media terminal adapter and to map any received event notification text messages from the media terminal adapter into one or more V5 SCN protocol messages to send to the local exchange.

24. An apparatus for interacting with a local exchange comprising:
a voice gateway to coupled to the local exchange, said voice gateway including:
a V5 interface for coupling to the local exchange and to receive V5 SCN protocol messages in binary format;
an Internet Protocol interface for coupling to the media terminal adapter via an Internet Protocol network and to send and receive text messages in NCS format to and from the media terminal adapter; and
a processor coupled to the V5 interface and coupled to the Internet Protocol interface to map one or more information elements included in any received V5 SCN protocol messages in a binary format into one or more NCS formatted signal requests and/or one or more NCS event requests to send to the media terminal adapter and to map any received text messages from the media terminal adapter into one or more V5 SCN protocol messages to send to the local exchange; and
a media terminal adapter coupled to the voice gateway, said media terminal adapter including:
a processor receiving text messages from the voice gateway, controlling telephony operations of the media terminal adapter based on the received text messages, and sending one or more text messages to the voice gateway in response to requests for related information regarding the telephony operations;
a memory coupled to the processor and storing a management information base including a plurality of default parameters and values for said telephony operations, wherein said processor obtains said default parameters and values as needed to completely define a given telephony operation when not included in the received text messages; and
an Internet Protocol interface for coupling to an Internet Protocol network.

25. A method for configuring an access device coupled to an Internet Protocol network to apply a desired signal to an access line requested by a local exchange comprising:
receiving a V5 protocol message from the local exchange requesting the desired signal to be applied to the access line;
mapping the V5 protocol message into a text message in NCS format containing one or more parameters associated with the desired signal;
sending the text message to the access device over the Internet Protocol network;
adjusting a configuration of the access device in accordance with the received text message using the one or more parameters included in the text message and one or more default values stored in a management information base accessible to the access device to define the desired signal; and
applying the desired signal to the access line.

* * * * *